INVENTORS
ALEXANDER ARTHUR MITTENBERGS
WILLIAM FREDERICK SCHARENBERG
BY
William A. Drucker
ATTORNEY.

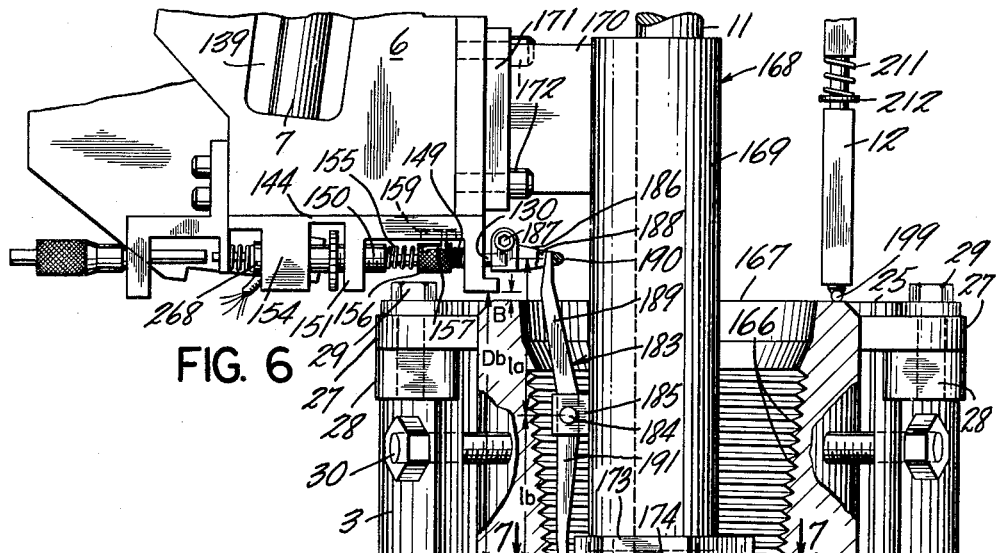
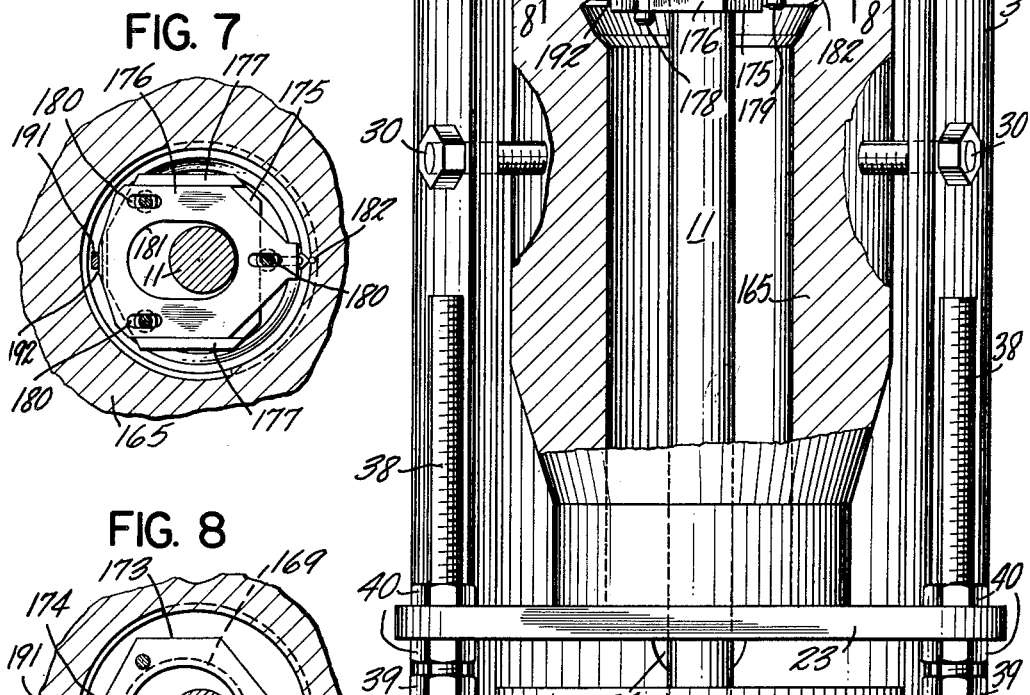
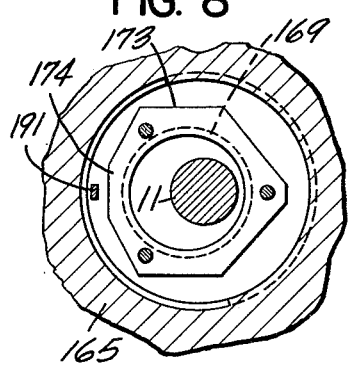

INVENTORS
ALEXANDER ARTHUR MITTENBERGS
WILLIAM FREDERICK SCHARENBERG
BY

ATTORNEY.

3,047,960
METHOD AND APPARATUS FOR INSPECTING THREADS AND CYLINDERS

Alexander Arthur Mittenbergs and William Frederick Scharenberg, Jr., Columbus, Ohio, assignors, by mesne assignments, to American Iron and Machine Works Company, Inc., Oklahoma City, Okla., a corporation of Delaware Filed Oct. 30, 1959, Ser. No. 849,976
21 Claims. (Cl. 33—199)

This invention relates to a method and apparatus for obtaining and recording dimensional data from cylindrical parts, and especially for determining and recording the actual geometry and dimensions of threads continuously along the full length thereof.

The invention is of particular advantage in the inspecting and measuring of taper threads of tool joints for oil drilling equipment as well as other applications of taper threads, such as in shafts of propulsion equipment for ships and in mining equipment. Although the principles of the invention are employed particularly for measuring taper threads, they can also be used in many cases for inspecting cylindrical threads and other cylindrical pieces. The latter can be considered as a special case of tapers having a taper equal to zero.

The fit between taper-threaded tool joints as used in oil drilling equipment is determined by the characteristics of the threaded portions and the shoulder and face surfaces of the tool joints. It is known that ring and plug taper-thread gauges do not control the individual elements of taper threads. The position of a gauge on the product is affected by the cumulative effect of all thread-element errors in the product and in the gauge. These may either compound or cancel one another. Therefore, the fit between two taper threads when they are made up can be quite different from that predicted by the gauges. The possible errors and discrepancies in threads may be relatively high if these threads are produced to the standard specified tolerances and inspected with the standard gauging procedures.

The effects of the individual thread-element errors and discrepancies can be expressed either in an axial displacement of the thread against a perfect condition or in a pitch-diameter error. The relation between the axial displacement and the pitch-diameter error is determined by the taper of the thread. Distortions of the threads from self-relieving of residual stresses created by machining operations and warpage during subsequent production processes, such as heat treatment, hard banding, and flash-welding operations, could add considerably to the total discrepancies and the pitch-diameter error. Conceivably, the thread could become out of round, the pitch cone could have deviations from its nominal shape and the lead could become distorted, for example.

The actual thread geometry and the variations can be determined only by accurate measurements. Since the fit between two threaded joints is essential for proper functioning of the rotary shouldered connections, the measurements should include all those taper-thread elements which influence the fit. These include (a) the taper angle, taper straightness, and roundness of the pitch cone; (b) thread lead variations and irregularities (such as "drunken helix"); (c) pin-shoulder and box-face squareness against thread axis and the flatness; (d) pitch diameter at a certain location from the shoulder and face surfaces; and (e) thread-profile half-angles and truncations. The characteristics of the latter thread elements e are usually within specified tolerances and of negligible effect, as will be explained hereinafter.

Existing methods and available equipment are incapable of obtaining satisfactory measurements of all the above-mentioned thread elements continuously along the entire thread length with respect to the characteristics of the thread itself, and in addition inspecting circumferentially of the thread axis the face and shoulder characteristics of the part under inspection.

The known methods and available apparatus measure one thread-element at a time and usually in a single plane only, i.e., along a pitch-cone generatrix. To obtain a more satisfactory determination and recording of the overall thread geometry and dimensions, measurements have to be taken along a number of generatrices and plotted on graphs. Obviously, interpolating thread characteristics between plotted points is inaccurate. Thus, such a method is time-consuming, and does not give a good picture of the characteristics of the thread element along the entire length of thread because the number of measurements is limited by practical considerations. Indeed, some critical thread details could be easily missed.

There are devices for obtaining continuous readings of cylindrical threads in which the usual method is to employ a sensing probe which tracks the thread groove of a part under test as the latter is rotated between fixed centers, the movement of the sensing probe transversely and axially of the work piece being indicated or recorded as desired. Here, too, the characteristics of all thread elements are not simultaneously recorded, nor have such devices been adapted to record all critical thread element characteristics continuously. Thus, one such known device detects and records deviations of the helical path from theoretical or normal helix, commonly known as a "drunken helix" checker. However, this device utilizes two probes which contact the thread flanks of the part under test, one of said probes functioning as a reference probe. Obviously, this method has the inherent disadvantage of measuring deviations of the helix from true helix by utilizing the thread helix under inspection as the basis from which the deviation is detected.

Another known device measures deviations in pitch diameter from theoretical or nominal diameter by means of two probes spaced 180 degrees apart on a single thread groove, one of said probes being a fixed driving probe which moves a carriage axially of the rotating part under inspection, the other diametrically opposed probe being mounted on the carriage and movable in response to changes in effective diameter of the thread being inspected. The disadvantage here is that the two probes, being spaced axially of the helix a distance of one-half of the pitch, do not measure the true effective over-all diameter in a transverse plane of the thread.

There is a disadvantage in using the thread under inspection as a reference thread. For example, a single thread may have both a radially inward and a radially outward deviation in pitch-cylinder radius from nominal under the respective probes which would result in the cancelling out of mutually opposing effects and consequently a misinterpretation of the recorded "effective" diameter of the thread at any particular point along the axis of the thread.

Various other devices employ a master reference thread, but none is known which can simultaneously and continuously record the characteristics of a multiple number of thread elements over the entire thread length. This is also true of known optical comparators.

In a taper thread one thread element affects the others. For example, a deviation from the true taper will create a deviation in pitch diameter and may also affect the lead; a lead variation will influence the measured pitch diameter, for example. Therefore, it is desirable to obtain simultaneous measurements of the related thread elements, and these measurements should be continuous to provide complete information concerning the entire taper-thread geometry.

Accordingly, it is an object of this invention to provide a method and an apparatus for continuously and simultaneously determining and recording the geometry and dimensions of a plurality of related thread elements, such as taper angle and straightness, roundness of pitch cone, thread lead variations and irregularities, and pitch diameter at any specified location.

A further object is to provide a method and apparatus for determining and recording the pin-shoulder and box-face squareness of taper-thread tool joints against the thread axis, as well as their flatness, and relating such data to the data recorded for the thread elements.

Another object of the invention is to provide a method and means for obtaining continuous recordings of thread elements which can be analyzed for deviations of thread-element characteristics from nominal and thereby permit accurate quality control over manufacturing processes, and allow of periodic inspection of shop plug and ring gauges to determine defects therein due to wear.

Still another object is to provide a method and means for measuring thread elements with an accuracy sufficient to insure an optimum fit between threaded parts, and to obtain a record of the precise measurement of threaded parts for replacement and duplication purposes.

Basically, the method of the present invention realizes the foregoing objects by measuring simultaneously the deviations from nominal of the pitch-cone radius (not diameter) and the lead of a thread continuously along the entire length of the thread. The axis of the thread is established independently of the other elements of the threaded part, e.g., a tool joint, by means of a set of aligning rings which are mated for a close sliding fit and are provided with nominal taper lands made to the nominal thread taper. The lands contact the crests of the threads, thus seating the aligning rings in a fixed position, the axis of the aligning rings serving as the reference axis for the threads.

The reference axis is arranged parallel to the axis of an accurate lead or reference screw which is rotated synchronously with the part under inspection; a sensing probe traces the flanks of the thread groove of the part under inspection, and its movements transversely of the axis of the threaded part are related to an accurate taper slide, made to the nominal taper of the part under inspection, upon which the sensing probe rides, thereby recording deviations in pitch radius from nominal.

Another sensing device associated with the lead screw and driven by the first sensing probe continuously detects deviations in the lead between the lead screw and the thread being inspected. The thread variations are registered electrically and plotted on recorder charts, thus providing a continuous graphical representation of thread deviations from nominal. Linear measurements are taken to determine the pitch radius error at one thread location. This makes it possible to establish a reference line on the recordings from which the errors in pitch-cone radii can be determined along the entire thread. Recordings of external thread shoulders and internal thread faces are also obtained.

The apparatus of the present invention includes a drum in axial parallelism with an accurate lead screw and rotatable in synchronism therewith, means in the drum for adjustably supporting a threaded part, e.g., a tool joint, so that the thread axis may be aligned with the aforementioned axis by means of aligning rings with a minimum of radial or lateral run-out under rotation of the drum, and a sensing probe for tracing the thread and for driving a carriage mounted on a taper slide made to the nominal taper of the tool joint. A second sensing probe mounted on the carriage abuts a transverse surface on a nut on the lead screw, which is fixed against rotation. This permits movement of the first probe longitudinally of the thread axis relative to the second probe to measure lead variations of the thread of the part under test against that of the accurate lead screw. Simultaneously, the first probe detects variations in taper of the pitch-cone radius of the thread relative to the accurate taper slide, as the probe traces the thread and moves longitudinally thereof under rotation of the thread. A third sensing probe detects deviations of pin shoulders and box faces from squareness with the thread axis and from flatness. If desired, additional sensing devices may be employed to detect deviations of a cylindrical surface (e.g., the body of a threaded member) from roundness and from concentricity with respect to the axis. The movements of the sensing devices actuate linear variable differential transformers which communicate the detected thread element variations to the styluses of a chart recorder through an amplifier system. The recorder is driven in synchronism with the revolving drum in which the part under inspection is mounted. The plotted recordings provide a continuous graphical representation of the thread element characteristics.

The foregoing and other objects of the invention and advantages thereof, as well as the special features of construction, assembly, arrangement and operation of the parts of the apparatus forming a part of the present invention, will appear more fully from the following description of a preferred embodiment thereof as illustrated in the accompanying drawing, like parts being designated by like reference characters. The invention is illustrated in connection with the testing of taper-thread tool joints such as are used in oil drilling equipment, and numerical values and examples apply only to 4½-inch-diameter, full-hole tool-joint threads and their gauges, which have five threads per inch and a taper of three inches per foot.

In the drawing:

FIG. 4 is an enlarged section taken on the line 4—4 of FIG. 1, showing details of the taper slide carriage and reference lead screw;

FIG. 6 is an enlarged fragmentary elevation of the apparatus illustrating a box end of a tool joint mounted for inspection, with the special internal thread attachment fastened to the carrier of the machine;

FIG. 7 is a section taken on the line 7—7 of FIG. 6;

FIG. 8 is a section taken on the line 8—8 of FIG. 6;

FIG. 9 is a partly schematic vertical section of the aligning rings used with pin ends;

FIG. 10 is partly schematic vertical section of the aligning rings used with box ends;

FIG. 11 is an elevation, partly in section, of a plug gauge assembled with fixtures adapting the gauge to be measured on the apparatus of the present invention;

FIG. 12 is a corresponding view to FIG. 11 showing a ring gauge adapted to be measured by the apparatus;

Figure 1:
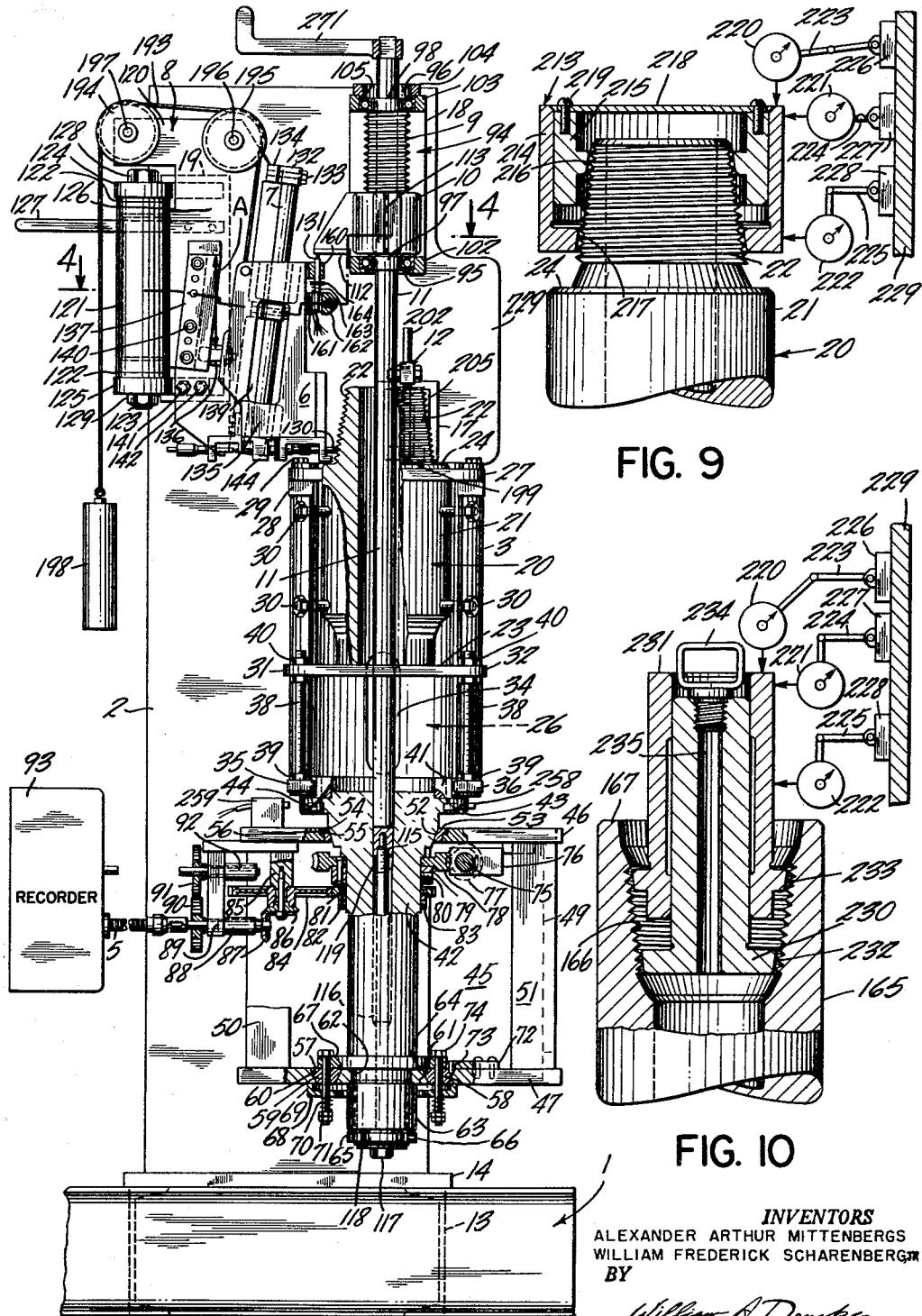
FIG. 1 is an elevation of the front of the apparatus of the invention in operating position for inspecting the pin end of a tool joint, partly in section, the electrical circuits being omitted for clarity.

Referring to FIGS. 1 to 5, there is shown the entire machine in operating position for inspecting the pin end of a taper-thread tool joint. The machine consists basically, of a base 1, a vertical frame 2, a rotating drum 3 for mounting the tool joints, a drive operated by a hand wheel 4 (FIG. 2), a recorder drive shaft 5, a sliding carrier 6 containing sensing devices, an accurate taper slide 7 mounted on a swinging frame 8, an accurate lead screw 9 with a nut 10 restricted from rotation, a removable drive shaft 11, and a sensing device 12 for pin shoulders. The vertical disposition of the machine components is chosen to avoid deflections in critical parts, due to their weight, and to accommodate the tool-joint aligning method employing the aligning rings, to be described hereinafter. It is to be understood that in other applications the machine components may be disposed horizontally.

Figure 2:
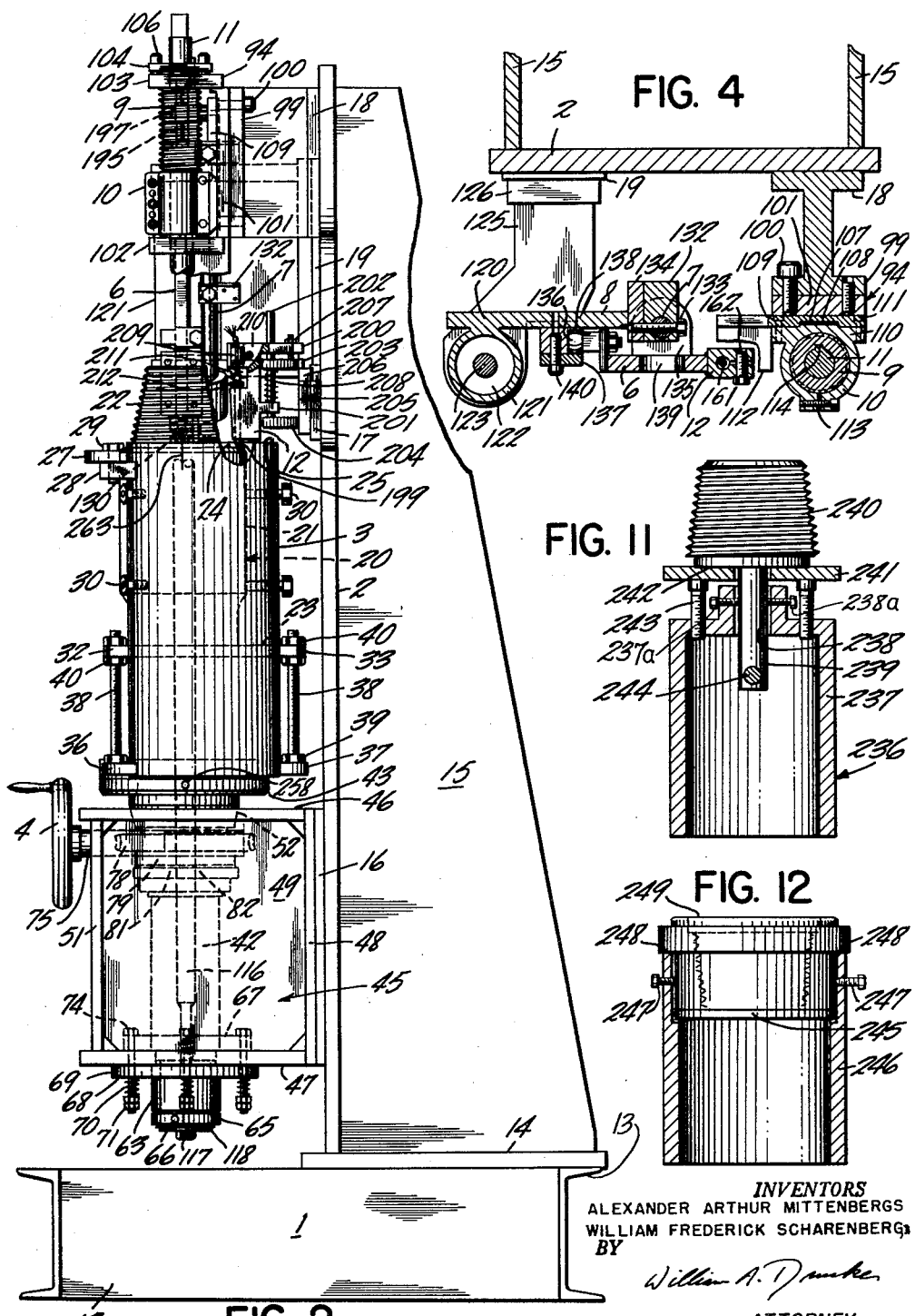
FIG. 2 is a side elevation of the apparatus, parts being omitted for clarity.

The base 1 of the machine is a welded assembly of channel shapes 13 on which is mounted a bed plate 14 supporting the vertical flat plate frame 2 provided with suitable stiffener plates 15 (FIG. 2). A number of mounting pads or plates 16, 17, 18 and 19 (FIG. 2) are secured to the front face of the frame 2 for mounting various components of the machine now to be described.

The full-hole pin-end tool joint 20, comprising a cylindrical body portion 21 and a taper-thread 22 is shown mounted within the drum 3 upon a platform 23 such that the shoulder 24 of the pin-end is level with the top surface 25 (FIG. 2) of the drum, the taper thread 22 extending completely above the top surface of the drum.

The drum body 3 is cylindrical in shape and a cutaway wall portion provides a vertically extending opening 26 to permit loading and unloading of the tool joints through said opening. A removable brace 27 connected between lugs 28 at the upper corners of the drum opening 26 by means of bolts 29 furnishes rigidity to the drum body. A plurality of dog-point setscrews 30 threaded through the drum body 3 at two levels are used for aligning and holding the tool joint 20 within the drum after the tool joint has been mounted upon the steel plate platform 23. The platform is adjustably supported so that it can be raised or lowered to accommodate the differences in length between pin ends and box ends (to be described) and to adjust the vertical position of shoulder and face surfaces of pin and box ends to the desired level—within ±1/64 inch of the drum top surface. To this end, the platform 23 is provided with three lateral extensions 31, 32 and 33, (FIG. 2), projecting from the drum, extensions 31 and 32 extending alongside the vertical walls of opening 26 of the drum 3 and extension 33 protruding through an elongated slot 34 provided in the wall of the drum opposite opening 26. Three lugs 35, 36 and 37 (FIG. 2) are welded to the outer wall surface of the drum 3 close to the bottom of the latter and are tapped to receive threaded bolt studs 38 retained by lock nuts 39 and extending upwardly through holes drilled through the platform extensions 31, 32 and 33, the platform 23 being thus adjustably supported between pairs of lock nuts 40 threaded on the studs 38.

A cylindrical flange plate 41 having an opening to receive the shaft 11 therethrough is welded to the lower portion of the inside of the drum 3, whereby the drum may be mounted on a vertical spindle 42 having an upper flange 43 of the same diameter as and underlying drum flange 41, the flanges being secured by means of a plurality of machine screws 44. The spindle 42 is mounted in and extends through a housing 45 welded or otherwise attached to mounting plate 16 on vertical frame 2. The housing 45 consists of a welded assembly of top and bottom plates 46 and 47, a rear wall plate 48 (FIG. 2) by means of which the housing is mounted on frame plate 16 and a side closure plate 49. The front and one side of the housing are uncovered to permit access to mechanism to be hereinafter described, the stiffener plates 50 and 51 serving to reinforce the housing frame at the corners thereof.

The drum spindle 42 rotates in two tapered bearings inserted in the top and bottom plates 46 and 47 of housing 45. Referring particularly to FIG. 1, the spindle 42 has an inward taper 52 where it passes through the top plate 46 of the housing, and this tapered portion 52 seats within a tapered bronze bearing ring 53, the latter being provided with a circular external flange or collar 54 which seats upon a complementary circular shoulder 55 extending inwardly from a circular opening 56 in top housing plate 46. This top bearing 53 supports the weight of the drum 3, spindle 42, and the tool joint 20 mounted in the drum.

The bottom housing plate 47 is provided with an opening 57 concentric with upper plate opening 56 and in which is located the lower spindle bearing. Again referring particularly to FIG. 1, the periphery 59 of opening 57 tapers down inwardly and accommodates thereon a steel ring 58 with a complementary external peripheral taper 60. The inner periphery of the ring 58 tapers down outwardly to permit seating thereon of a bronze bearing ring 61 having a matching taper and fitted on a stepped-down extension 62 of spindle 42. The bearing ring 61 is rigidly clamped in position on stepped-down spindle portion 62 between the shoulder 64 of the spindle and a sleeve 63, the latter being tightened against the ring 61 by means of a lock nut 65 threaded on the lowermost portion of the spindle and provided with a set screw 66. The lower end portion of spindle 42 extends below the bottom plate 47 of spindle housing 45 for reasons which will appear.

The steel ring 58 is provided with a plurality of evenly spaced alternate inner and outer radial slits (not shown) to permit flexibility thereof. An annular clamping ring 67 overlies the slit ring 58 in contact therewith, and another annular clamping ring 68 underlies the ring 58 in spaced relation thereto, the clamping ring 68 having an upwardly extending outer peripheral flange 69 which abuts the bottom surface of housing plate 47 on a perimeter outside the periphery of slit ring 58. Several bolts 74 pass through the assembly of the slit ring 58 and clamping rings 67 and 68, and helical compression springs 70 received over said bolts and retained by means of adjustable nuts 71, work to cause the slit ring 58 to be seated firmly between the bottom housing plate 47 and bearing 61. Such an arrangement precludes objectionable clearances in either of the bearings 53 or 61 and, therefore, assures stability of the spindle 42 and compensates for wear of the bearing surfaces. A flat bar 72, bolted to the bottom housing plate 47, is provided with a pin 73 which is received in a drilled hole in the slit ring 58, and prevents rotation of the ring during operation of the machine.

The spindle 42 is rotated through a worm gear drive by means of handwheel 4 (FIG. 2). If desired, a V-grooved wheel may be employed, to be driven through a V-belt from a suitable motor (not shown). The handwheel 4 is mounted on a shaft 75 which is journalled in a suitable bracket 76 mounted in housing 45 and carries a worm 77 in mesh with a worm gear 78 mounted on spindle 42. Gear 78 is provided with a collar 79 and set screw 80 to secure the gear on the spindle. A spur gear 81 secured to spindle to spindle 42 by means of an integral collar 82 with set screw 83 meshes with an equal spur gear 84 rotatably mounted on a shaft fixed in a bracket 85. A miter gear 86 rotatable with the spur gear 84 meshes with a miter gear 87 mounted on a shaft 88 journalled in a bracket 89 and mounting at its outer end a spur gear 90 in mesh with an equal spur gear 91 mounted on a shaft 92 also journalled in the bracket 89.

Extensions of the shafts 88 and 92 serve as take-offs for a recorder 93 which is driven at the same turning rate as the drum and spindle. Since the shafts 88 and 92 rotate in opposite directions, any kind of recorder may be employed regardless of the driving direction required for the recorder. It should be understood that only one of the shafts 88 and 92 is coupled to the recorder by means of a removable flexible shaft 5 after the driving direction has been determined. The arrangement does not require a very close alignment of the recorder shaft with the take-off shaft of the machine and permits easy disconnecting of the recorder drive for balancing and calibrating the electrical system of the invention when the recorder must be turned by hand. The operation of the recorder will be considered further in connection with the description of the electrical system of the present invention.

The turning axis of the drum 3, i.e., of the spindle 42, is also the axis of an accurate cylindrical lead screw 9 having the nominal lead of the tool-joint thread 22 and rotated together with the tool joint 20 by the removable lead screw drive shaft 11 connecting the screw 9 with the drum 3. The lead screw 9 is mounted in two sealed precision ball bearings 95 and 96 installed with light press fits against the lead screw on end portions 97 and 98 thereof. The flange 99 (FIG. 2) of an I-shaped mounting member 18, suitably secured to the vertical frame 2 of the machine support, is utilized to mount the lead screw 9 in axial alignment with the rotatable drum 3.

Referring particularly to FIGS 1, 2 and 4, a channel-shaped bracket 94 (FIG. 2) is mounted on member 18 by means of machine screws 100, one of which is shown, connecting the web 101 of the channel member 94 to the flange 99 of mounting member 18. The lower horizontal leg 102 of bracket 94 is bored to permit passage of the drive shaft 11 therethrough and is countersunk and accurately machined to receive a lower ball bearing 95 which is installed therein with a light press fit. The upper leg 103 of bracket 94 is similarly bored to receive the screw drive shaft 11 therethrough and is also accurately machined to receive an upper bearing 96 installed with a light press fit. The bearings are preloaded at assembly to eliminate clearances. A bearing adjusting cap 104 bored for passage of the screw drive shaft 11 is mounted atop the upper bracket leg 103 and has an inner peripheral depending flange 105 which abuts the upper bearing 96. Machine screws 106 are received through drilled holes in the bearing cap 104 and threaded into the upper arm 103 of bracket 94, whereby the bearing cap 104 may be tightened to adjust accurately the bearings of the lead screw.

As shown in FIG. 4, the lead screw nut 10 is secured against rotation by means of a key 107 which is fitted with some interference in a key seat 108 accurately machined in a flat plate member 109 to which the base 110 of the nut 10 is dowelled upon assembly and secured by means of cap screws 111. The inner face of the web 101 of the bracket 94 is accurately machined to provide a sliding fit between the web and the member 109 to which the nut 10 is secured. The member 109 is provided with a laterally extending horizontal flange portion 112 (FIG. 1) the underside of which is accurately machined square to the axis of the lead screw for a purpose to be described. The nut 10 has lapped threads and is provided with a slit 113 permitting taking out backlash.

The lead screw 9 has highly accurate threads. The lead error does not exceed 0.0001 inch per inch and 0.0002 inch in the entire screw length. For comparison, the lead tolerance specified for plant master gauges is ±0.0004 inch for the plug and ±0.0006 inch for the ring gauge. These maximum allowable lead errors in the gauges are permitted between any two threads, whether adjacent or separated by other threads.

The lead-screw drive shaft 11 is inserted from the top of the machine. A key 114 (FIG. 4) is attached to the shaft at the top end and it engages a keyway in the bore of the lead screw 9. A self-locking Morse taper 115 is provided at the lower end of the drive shaft. This permits locking the lead screw with the drum spindle 42 in any angular position by means of a matching taper in the upper portion of the axial spindle bore 116. A long bolt 117 provided with a washer 118 is received within spindle bore 116 and screwed into the bottom end 119 of the drive shaft. It can be used for securing the drive shaft in position. Experience shows, however, that it is sufficient to drop the drive shaft about ⅜ inch to lock the taper. Thus, the bolt 117 is used mainly for removing the drive shaft. The bolt is screwed into the drive shaft for several revolutions and a tapping on the head from beneath releases the taper.

The foregoing arrangement for driving the lead screw 9 from the drum spindle 42 by a central drive shaft 11 is feasible in the case of a tool joint, since the latter has a bore of sufficient diameter to receive the shaft 11 therethrough. This arrangement also permits aligning the axis of the rotating drum with that of the lead screw.

When inspecting a cylindrical part which cannot receive the central drive shaft 11 therethrough, the lead screw and drum may be rotated in synchronism by means of a parallel jack shaft coupled to the lead screw and spindle through equal sets of matched gears. A circumferentially adjustable coupling in the lead-screw shaft is a convenient way of adjusting the angular relation between the lead screw and drum.

Moreover, it is not necessary that the lead screw and drum-spindle assembly be in axial alignment, inasmuch as the only requirement is that the respective axes be in parallel relation. Consequently, the screw and drum-spindle axes could be mounted on parallel shafts and driven in synchronism, for example, by a common jack-shaft as previously mentioned, or otherwise.

The carrier 6 containing the thread element sensing devices slides along an accurate taper slide 7 mounted on the swinging frame 8. The swinging frame and carrier unit is shown in operating position in FIGS. 1 to 5, and this unit must be swung out of the way to permit loading, unloading, and the aligning of tool joints within the drum 3.

The swinging frame 8 consists of an irregularly-shaped flat plate member 120 to one vertical marginal portion of which is welded a tubular member 121. The ends of the member 121 are countersunk and press fitted with hinge bushings 122 having axially aligned bores through which is received a hinge pin 123 which also extends through bores in the upper and lower arms 124 and 125 of a bracket 126 mounted on pad 19 welded to vertical frame plate 2. The bracket is generally U-shaped with the arms 124 and 125 being offset laterally to permit swinging movement of the frame 8 into and out of operative position of the thread sensing devices mounted on carrier 6. A removable handle bar 127 mounted on the back of the frame 8 facilitates this operation.

The ends of the hinge pin 123 are provided respectively with a cap 128 and a threaded portion carrying a nut 129 thereby retaining the hinge pin in position. The hinge 123 is installed with an interference in both supports 124 and 125 and in the bushings 122 in tubular member 121. A slight axial interference between the tubular member 121 and the supports 124 and 125 is also provided. Thus, there is no looseness of the pivot. The interference fits, however, are light enough to permit turning of the frame 8 with the handle 127.

The carrier 6 holding two axially slidable spherical-ended or "ball-point" styluses 130 and 131 is mounted on an accurate taper slide 7 made to the nominal taper of the tool-joint thread 22. The taper slide 7 is rigidly attached to the frame 8 by means of three split mounting blocks 132 secured to pads 134 on the frame 8 by means of machine screws 133, and is an accurately polished, hardened, tool-steel shafting. The carrier 6 slides on this shaft on two hardened steel bushings 135 having line-honed bores. There is practically no clearance between the bushings and the slide and the carrier 6 can only slide if the surfaces are dry. An opening 139 may be provided in the carrier 6 to lighten the latter.

To prevent the carrier from turning on the slide, an axially convex or oval roller 136 (FIG. 4) on a needle bearing is attached to the carrier 6 and guided between two ground, hardened steel surfaces 137 and 138 mounted on an accurately machined surface of the frame 8 by means of cap screws 140. The total clearance between the two surfaces and the roller is about 0.0005 inch. This clearance has no effect on the recordings because the frictional forces do not change their direction during the process of obtaining a recording and, therefore, the roller will be riding against the same surface (outer for pin ends and inner for the box ends). This clearance is not large enough to influence the pitch-cone radius measurements.

The pivot 123 of the swinging frame 8 is mounted accurately parallel to the turning axis of the rotating drum 3. In operating position, the lower and upper styluses 130 and 131 lie in the common plane of the two axes. To adjust the position of the frame 8 to give the proper locations of the styluses, a setscrew 141 (FIG. 1) threaded through the frame 8 is provided to act as a stop against the lower support 125 of the bracket 126. The swinging frame is locked in place with a locking screw 142 which passes through a hole in the frame 8 and is received in a tapped bore in the lower bracket arm 125. The taper slide 7, when in operating position, is parallel to the common plane of the drum turning axis and the pivot 123. In this position, the proper taper against the turning axis is accurately established by placing shims (not shown) under the attaching blocks 132 holding the slide.

Figure 5:
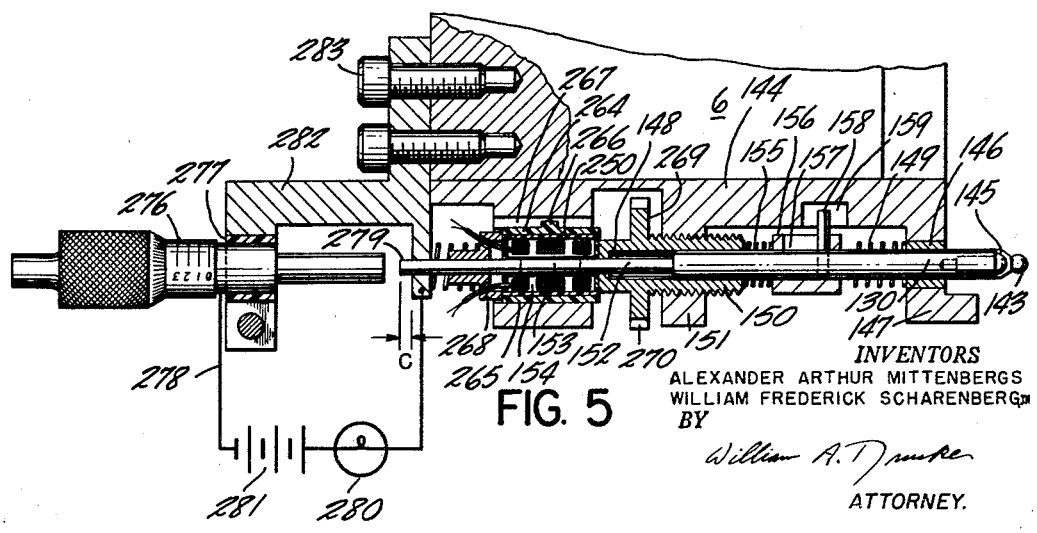
FIG. 5 is an enlarged cross-sectional detail of the thread-sensing probe and related instruments.

The lower stylus body 130 is mounted for horizontal axial movement in a bracket 144 attached to the underside of the carriage 6. Referring to FIGS. 1 and 5, the lower stylus 130 is provided with a ball 143 which engages the flanks of the tool-joint thread profile 22.

Ideally, the thread flanks should be contacted at the pitch line. For a taper thread, this would require a special profiled stylus end. Fabrication and mounting of such a stylus end to the required degree of accuracy would be very difficult, if not impossible. High-precision balls of the selected 0.125-inch-diameter size are available commercially. A ball of this size contacts the long flank of thread profile, theoretically, almost on the pitch line of 4½ inch tool-joint threads. On the short flank, the theoretical contact point is 0.0135 inch from the pitch line. This discrepancy has no significant effect on the measurements because the only thead-element errors affecting the position of the ball within the thread groove with respect to the pitch line are the errors of flank half-angles, and the effect of these is negligible.

A tungsten carbide precision ground ball is used to minimize ball wear. The ball 143 is silver soldered in a small holder 145 which is screwd into the stylus body 130 (FIG. 5). The forward end of the stylus body 130 is mounted in a bushing 146 inserted in the depending arm 147 of the bracket 144. The rear end of the stylus body is slidably received within the bore 148 of a stylus guide 150 which is threaded through a depending arm 151 of the bracket 144. An extension 152 of the stylus body is connected by threads to the core 153 of a linear variable differential transformer 154 which forms a part of the electrical recording system of the invention, to be described hereinafter. Electrical linear variable differential transformer units, hereinafter referred to as LVDT, are commercially available and their complete description can be found in literature. A partial description of an LVDT will be given in connection with the electrical system employed in the invention.

The coil of the LVDT unit is mounted on the carrier in fixed position (disregarding adjustment provisions). At a certain electrical input, an axial displacement of the core from its zero position results in an electrical output. The latter is proportional to the displacement. Thus, a displacement of the stylus with respect to the carrier can be measured electrically if the relationship between the displacement and the electrical output of the LVDT is known. This relationship can be easily established by moving the stylus a known distance (e.g., wtih a micrometer screw) and measuring the electrical output.

The ball 143 of the stylus 130 (FIG. 5) is maintained in contact with the thread flanks of the pin-end tool joint by a helical compression spring 155 disposed between the stylus guide 150 and a sleeve 156 slidably mounted on the stylus body 130. A second helical compression spring 149 disposed between the sleeve 156 and the forward depending arm 147 of the bracket 144 is utilized in connection with an attachment for measuring box-end tool joints, as will be described hereinafter.

The sleeve 156 is provided with a Z-shape slot 157 in a wall portion thereof which cooperates with a pin 158 screwed into the stylus body 130 and extending through said Z-slot and riding in a groove 159 formed in the underside of the bracket 144. This arrangement prevents the stylus from turning. Positioning of the sleeve, so that one or the other leg of the Z-slot contacts the pin, compresses one of the springs 149 and 155 and relieves the other, thus reversing the direction of stylus pressure. As shown in FIG. 5, the sleeve 156 is positioned to compress the spring 155 which thus urges the stylus body 130 and its ball 143 to the right, as viewed, into contact with the thread flanks 22 of the pin-end taper tool joint shown in FIG. 1. The spring should be as light as possible to avoid large frictional forces and deflections, but, on the other hand, must be strong enough to keep the ball of the lower stylus 130 in contact with the thread flanks of the tool joint.

Figure 3:
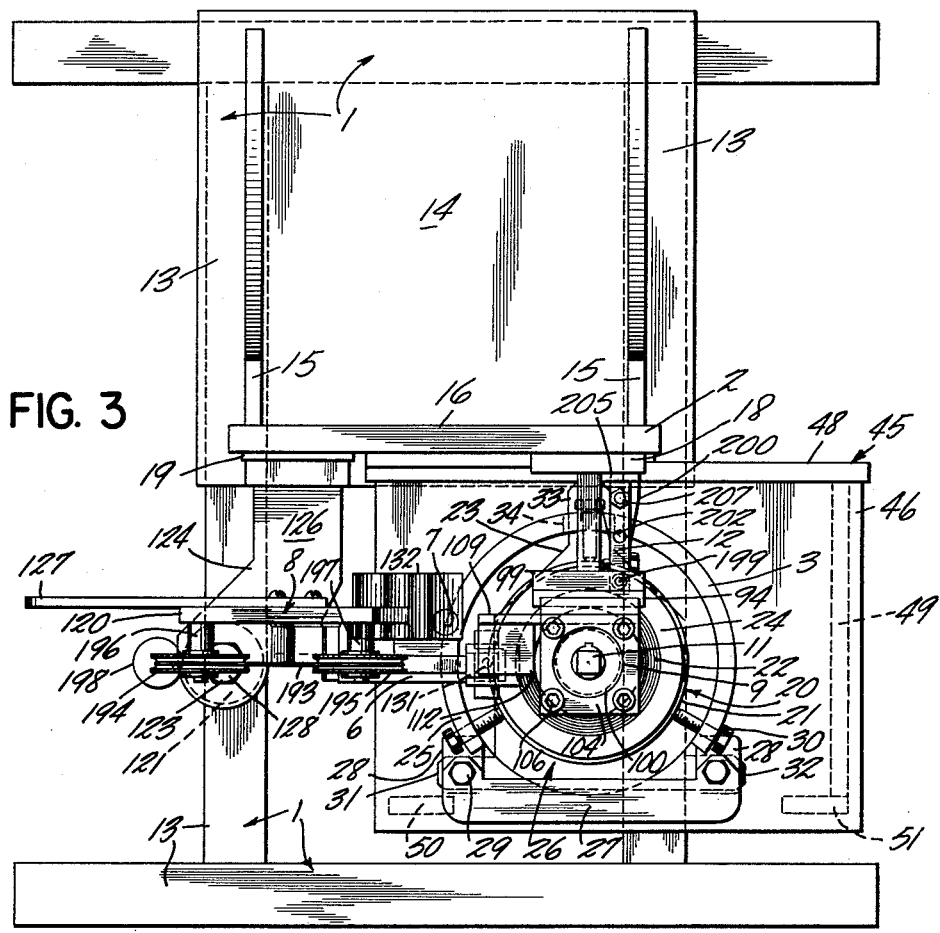
FIG. 3 is a plan view of the apparatus.

The ball-pointed stylus 131, mounted in the upper portion of the carrier 6, is disposed with its axis vertical to the accurately square horizontal surface 112 of the nut 10 on the vertical lead screw 9. The ball of this stylus 131 contacts the accurate surface 112. As shown in FIGS. 1 and 3, the stylus body 131 rides in the vertical bore of a bracket 160 affixed to the carrier 6. The lower end of the stylus is coaxially threaded to the core of an LVDT 161 mounted in the vertical bore of a split bracket 162 also affixed to the carrier. The stylus 131 is biased upwardly by means of a helical compression spring 163 acting against a collar 164 on the stylus body. The construction of the ball point of the upper stylus 131 is like that of the lower stylus 130, and the same considerations apply in selecting a suitable spring 163.

As the tool joint (pin end in this case) is rotated by the drum 3 together with the lead screw 9 connected to the spindle 42 of the drum 3 by the lead screw drive shaft 11, in a clockwise direction as viewed in FIG. 3 (for reasons which will be discussed), the lower stylus 130, in following the tool-joint thread groove, moves the carrier 6 up along the taper slide 7. Any variation in the horizontal distance between the taper slide 7 and the pitch-cone radius of the tool-joint thread 22 will cause a relative movement between the lower stylus 130 and the carrier 6 and result in electrical output of the LVDT 154. Thus, deviations from nominal in pitch-cone radius can be measured electrically. The vertical component of the carrier movement is controlled by the lead of the tool-joint thread 22. The upper stylus 131 follows the surface 112 of the nut 10 as the latter traverses the rotating accurate lead screw 9. A relative horizontal movement occurs between the ball of the stylus 131 and the nut surface 112. Variation in the tool-joint thread lead will cause a relative vertical movement between the upper stylus 131 and the carrier 6 and result in a change of the electrical output of the LVDT 161. Thus, deviation of the tool-joint lead from the nominal can be registered electrically.

As will appear fully hereinafter. connecting the two LVDT units through electrical amplifiers with two channels of a multi-channel recorder provides continuous and simultaneous recording of the two electrical outputs. These recordings are graphical representations of the deviations from nominal in the two tool-joint thread elements, pitch-cone radius and lead. The entire thread can be recorded on one chart. The scale of the recordings can be selected over a wide range by changing the amplification factor of the amplifiers. Adjustments of the electrical system also permit small changes in the scales, so that a known displacement of the styluses may be represented on the chart by a known, predetermined distance.

A special attachment is required for measuring the threads of the box end of a tool joint. Referring to FIGS. 6, 7 and 8, the box-end tool joint 165 with internal taper threads 166 is shown mounted on the drum platform 23 with the thread axis in alignment with the shaft 11, the axis of which, of course, coincides with the axes of the lead screw and drum spindle. Basically, the system is the same as for pin-ends. The box end is supported in the rotating drum so that the face surface 167 is approximately at the same level as that for pin shoulders, i.e., at the level of the surface 25 of the drum 3. The platform 23 is consequently adjusted at a lower elevation than in the case of pin ends.

The internal attachment assembly 168 includes a tubular member 169 surrounding the drive shaft 11, with an attaching pad 170, welded to the wall of the member 169, which is provided with a vertical flange surface 171 which is secured in turn to the slidable carrier 6 by machine screws 172. The opening in the tubular member 169 is of sufficient diameter to clear the drive shaft 11 throughout the lateral movement of the member as it rides up with the carriage 6 along the taper slide 7.

The bottom of the tubular member 169 is inserted in a machined countersunk surface of a flat plate 173 (FIG. 8) and secured thereto, as by welding. The bottom surface 174 of the plate is accurately machined square to the axis of the drum, and marginal portions of the plate 173 are cut away, as shown, to clear the internal threads of the box-end tool joint.

A second plate 175 (FIG. 7) underlies the first plate 173 in spaced relationship thereto (FIG. 6) so as to provide a space to receive a horizontally slidable stylus plate 176. The second retaining plate 175 is provided with upturned side flanges 177 the surfaces of which are machined to abut the side marginal portions of the first plate 173. The stylus plate 176 is slidably fitted between the plates 173 and 175, mating surfaces being accurately machined. The plates are held in assembled relation by machine screws 178 and 179 threaded into the first plate 173. The cap of the machine screw 179 which passes only through the nose portions of the stylus plate 176 and the first plate 173 is lightly adjusted against the nose of the stylus plate 176 to permit unhindered sliding of the latter. The screws pass with a sliding fit through elongated slots 180 in the stylus plate 176 to permit sliding freedom of the latter. Also, the stylus plate 176 and the retaining plate 175 are provided with elongated slots 181 (FIG. 7) centrally thereof to clear the shaft 11 under all measuring conditions. A ball-pointed stylus 182 is threaded into the nose of the stylus plate 176 and is designed to probe the internal thread flanks 166 of the box end 165 and drive the carriage 6, as in the case of a pin end, through mechanism now to be described.

The horizontal displacements of the stylus 182 due to variations in pitch-cone radius from nominal are mechanically transmitted to the stylus body 130 (located beneath the carriage 6) through an accurately pivoted lever 183. The pivot point 184 of the lever, which is provided with an accurate fulcrum, is mounted in a bracket 185 attached to the wall of the cylinder 169 on the same side as the carriage 6. An adapter 186 having a split block grip 187 is fastened to the end of stylus rod 130. The adapter 186 has a vertical slot 188 through which is received the upper arm 189 of the lever 183. The upper end of the lever is pulled by a pin 190 fixed in the end of the adapter. The sleeve 156 on the stylus rod 130 is positioned so that it is under the action of compression spring 149. The end of the lower lever arm 191 bears against a rounded back portion 192 of the stylus plate 176 to urge the ball-pointed stylus 182 into probing engagement with the flanks of the internal box threads 166. Displacement of the stylus 182 is thus translated into displacement of the stylus rod 130. Since the tube 169 moves together with the carrier on the taper slide, deviation from nominal in pitch-cone radius of the internal box thread 166 will be electrically registered by the output of LVDT 154 as in the case of pin threads. The relationship between the displacement of the stylus 182 and electrical output from the LVDT 154 can be established by moving the stylus 182 a known distance and measuring the electrical output (to be described). The foregoing arrangement for inspecting box ends can be simplified, of course, when a central drive shaft is not employed.

The carrier 6 is made as light as possible to minimize the effects of inertia and frictional forces on the behavior of the sensing devices and the recordings when testing pin and box ends. The main body and some other parts of the carrier are made from magnesium alloy. Another consideration for choosing magnesium is its dimensional stability. The spring pressure on the styluses 130 and 182, to keep them firmly in the thread grooves under operating conditions, depends on the force required to move the carrier up (or down, for the opposite rotational direction of the drum). To minimize the spring pressures and, thus, the frictional forces, the carrier is counterbalanced by weights. A light, flexible steel cable 193 (FIG. 1) is attached to the carrier 6. The cable runs over two pulleys 194, 195 mounted on precision antifriction bearings fitted on shafts 196, 197 extending from the carriage, and holds a suspended container 198 at its other end. The container holds lead pellets. When the box end threads are inspected, the internal attachment 168 is fastened to the carrier 6. To compensate for the weight of this attachment, a second container (not shown) is suspended beneath the first one, also holding lead pellets.

It has been found that the amount of counterweight is critical for satisfactory behavior of the sensing devices and for obtaining good, dependable recordings. To eliminate effects on the recordings of the clearances in the guiding surfaces of the styluses 130 and 182, the pressure on the stylus ball exerted by the rotating thread must remain in the same direction throughout the process of recording. It has been found that best results can be obtained if the stylus ball (and the carrier) is pushed up by the thread. In other words, the amount of counterweight should be such that force must be used to move the carrier up when it is under stylus spring pressure. This resisting force should be as small as possible to minimize deflections and frictional losses. On the other hand, it must be sufficient to assure that the direction of the thrust will not change. It has been determined that a resisting force on the order of a few ounces gives satisfactory performance of the sensing devices. The force required to move the carrier is larger when the stylus is in contact with threads (because of stylus spring pressure and, therefore, higher frictional resistance) than at a free position of the stylus. The latter has to be considered when the carrier is counterbalanced. In a free position, the carrier, therefore, has to be slightly overbalanced. The proper amount of weights is established experimentally for both external and internal setups. The internal setup requires a higher overbalance because of the larger leverage at the stylus 182 location with respect to the guide bushings of the carrier.

The rotational direction of the drum (clockwise as viewed in FIG. 3) is advantageous for other reasons. When the drum 3 is rotated in this direction, stylus 130 or the other stylus 182 moves up. The starting positions of the styluses, thus, are at the lower end of the thread. If the rotation of the drum were not stopped in time, the styluses would run out of the thread grooves at the top end and, because of spring pressure, they would travel a certain distance. This would cause the recorder pens to jump violently to one side and possibly be damaged. Using the opposite rotational direction of the drum, however, the styluses would move down. If the drum were not stopped in time, some critical parts, such as the styluses, carrier and internal attachment, for example, would be broken or damaged.

Moreover, the rotational direction selected was found by experiment to be more convenient in operating the machine and analyzing the recordings. If desired for some specific reasons, recordings can be obtained also when the drum is rotated in the opposite direction. To obtain satisfactory action of the sensing devices and satisfactory recordings, however, this may require changing the stylus springs, the amount of carrier counterweights, and some other adjustments. These changes would be necessitated by the differences in frictional forces on the carrier between the two rotational directions.

The sensing device or stylus used for inspecting and obtaining the recordings of pin shoulders and box faces is mounted independently of the carrier 6 and is operated separately from the three styluses 130, 131 and 182 already described.

Referring to FIGS. 1, 2 and 3, a ball-pointed stylus 199 (FIG. 2) is shown contacting the tool-joint pin shoulder 24. The unit assembly 12 mounting the stylus 199 includes two laterally extending arms 200 and 201 which are slidably hinged on a vertical pivot pin 202 which is mounted between the horizontal flanges 203 and 204 of a U-shaped bracket 205 the web or back 206 of which is suitably secured to the mounting pad 17 on the vertical machine support frame 2. A cone-point set screw 207 threaded through the upper arm 200 of the stylus unit 12 is received within a complementary conical recess (not shown) in the surface of the bracket flange 203 and locates the unit 12 in radial position. A compression spring 208 surrounding the pivot 202 is disposed between the upper bracket flange 203 and the lower stylus unit arm 201, thus urging the unit 12 downwardly so that the unit 12 is held in fixed vertical relation to the pin shoulder 24 as determined by the setting of the screw 207. When not in use, the unit 12 is swung out of the way, simply be lifting it up and turning it about 90 degrees against the frame 2. This feature also facilitates the loading and unloading of pin and box ends in the drum 3.

The ball-pointed shoulder stylus 199 rides in a vertical bore in the unit 12 and the upper end of the stylus is axially threaded to the core of the LVDT 209 which is held in an arcuately split clamping portion 210 of the unit 12. A suitable compression spring 211 and collar 212 mounted on the stylus 199 in a cut-away portion of the unit 12 cooperate to urge the stylus 199 downwardly into engagement with the pin shoulder 24 of the tool-joint. The characteristics of the compression spring 211 are determined by the same considerations which obtain in the case of the styluses previously discussed. Upon rotation of the drum 3, the stylus 199 and its related LVDT 209 will electrically register and record (as will be described hereinafter) the deviations of the shoulder surface from a plane perpendicular to the thread axis. The recordings indicate essentially the flatness of the shoulder circle and its squareness with respect to the thread axis. In FIG. 6, a portion of the unit 12 is shown with its stylus 199 contacting the shoulder surface 167 of a box-end tool joint. Obviously, only one revolution of a tool-joint is required to obtain a complete recording of a shoulder or face surface of a tool joint, although two full revolutions are desirable to facilitate analysis as will be discussed subsequently when described the recordings.

Mention has been made of the thread axis of the tool-joint and it is appropriate at this point to consider how such thread or reference axis is established, as its location is of importance in aligning tool-joints within the drum and analyzing recordings of tool-joint threads and shoulder and face surfaces.

The threads, together with the shoulder and face surfaces, determine the fit between two tool joints and, therefore, the axis of the threads is of primary importance. Studies have indicated that relatively large eccentricities and misalignments could exist between the thread axis and the other tool-joint elements. Thus, there are no surfaces on the tool joints accurate enough to be used as reference surfaces for thread measurements. Besides, the original thread turning axis may be out of straight and the shape of the entire thread could be irregular because of possible thread distortions, as described hereinbefore.

The distortions make it difficult to determine an axis which could be considered as the thread axis of such distorted threads. For example, if a gauge or an accurate threads adapter were to be screwed together with a distorted thread, the position of the gauge or the adapter in relation to the thread would be influenced by the irregularities. Conceivably, the gauge or the adapter, at least in some cases, would not be fixed on the thread and wobbling between the two parts would be possible. Wobbling is even possible between two otherwise perfect taper threads if one of them is out of round and if there is a difference in the two pitch-cone tapers.

The technique employed for aligning threads within the drum depends upon the configuration of the threaded parts. For example, if the threads are produced concentric to a cylindrical surface of the threaded member, aligning of such surfaces may be sufficient. In cases where no surface exists accurate enough to be used as a reference surface, as is the condition of the cylindrical surfaces of tool-joints, other methods such as those shown hereafter have to be used.

In view of the above considerations, a two-ring set was conceived to establish a fixed reference axis for thread measurements. This set permits centering and aligning of the tool-joint threads in the vertical rotating drum.

FIGS. 9 and 10 show, respectively, the aligning rings for pin- and box-end threads, and schematically the method of aligning the reference or thread axis with the centerline of the drum (not shown) after the tool joints have been mounted on the drum platform as previously described.

Referring to FIG. 9, the set of aligning rings 213 for a pin-end tool joint consists of an outer ring or cylinder 214 and an inner cylinder 215 having approximately equal weights and mated for a close sliding fit, the inner ring 215 being fitted coaxially with the outer ring 214. The rings 214 and 215 are respectively provided with narrow taper lands 217 and 216 extending inwardly from the wall of each ring and made to the nominal tool-joint thread taper, extending over approximately two threads 22 and contacting the crests thereof. To avoid edge contacts, the lands 216 and 217 have gradual curved approaches. The lands 217 of the outer ring 214 are located at the lower end of the ring and contact the thread crests at the large-diameter end of the pin thread. The lands 216 of the inner ring or cylinder 215 contact the thread crests of the small diameter end of the pin end. A flat bar handle 218 diagonally secured by screws 219 to the upper end of the inner ring 215 facilitates positioning of the rings on the thread crests. Since the two rings in a set can slide with respect to each other, they seat on the thread crests in a fixed position and no wobbling is possible, regardless of the thread shape and irregularities. Provided the rings are made accurately enough (concentricity is the main requirement), they will always seat themselves on the crests of a tool joint in the same position, irrespective of the radial relationship between the rings and the tool joint. Thus, the rings will always be concentric with respect to those points on thread crests at the large- and the small-diameter ends which contact the surfaces of the lands. The axis of the aligning rings also becomes the axis for the contact points on the crests.

The latter axis will coincide with the turning axis of a rotating drum if a tool-joint with installed aligning rings is aligned within the drum so that there is no radial or lateral runout of the rings.

The aligning of the rings can be done with precise dial indicators 221 and 222 which are shown, schematically, contacting the upper and lower outer wall portions of the outer aligning ring 214 to check for radial runout of the rings and, hence, the thread axis with respect to the centerline of the rotating drum in which the rings are mounted. In practice, the drum is rotated and the tool joint is continually adjusted until the radial runout as indicated by indicators 221 and 222 and the lateral runout as indicated by the indicator 220 are within minimum tolerances. The indicators are mounted on adjustable, universally pivoted extensions 223, 224 and 225 supported from magnetic bases, 226, 227 and 228, which may be positioned on a suitable portion 229 (see also FIG. 1) of the vertical plate 2 of the machine frame. Permanent indicator bases can be used, if desired.

Box-end tool joints can be aligned by the same method, as shown in FIG. 10, the principles of the operation being the same. Here, the inner and outer aligning rings or cylinders 230 and 231, mated for a close sliding fit, are respectively provided with outwardly extending lands 232 and 233 which contact the thread crests of the box end as in the case of the pin end. One land 232 is located at the lower end of the inner ring 230 and contacts the thread crests at the small-diameter end of the box thread, whereas the other land 233 on an intermediate portion of outer ring 231 contacts the thread crests at the large diameter end. A handle 234 threaded into the upper end of a bore 235 in the inner ring 230 facilitates handling the set of rings. The alignment of the set of rings against radial and lateral runout is accomplished by dial gauges 220, 221, and 222 as described for the pin-end tool-joint.

The two sets of aligning rings 214, 215 and 230, 231, mated for a close sliding fit, are made accurately concentric by grinding all critical surfaces at the same setting. The rings are made from stable tool steel and are heat treated, ground, and then stress relieved before the final grinding of the critical surfaces.

The pitch-cone of a tapered thread is the surface of revolution of the pitch line about the thread axis. The pitch line is tapered with respect to the axis, and the pitch-cone diameter is the distance between two opposite pitch lines measured perpendicular to the thread axis at a given axial location. According to the definition of pitch diameter, its location with respect to the thread profile is determined by the width of the thread groove. The two commonly used processes for producing tool-joint threads, milling and chasing, employ cutting tools (multiple-groove milling cutter, sometimes called a thread "hob," and a single-point cutter, respectively) formed to the profile of thread grooves. These so-called "topping" tools cut both thread flanks and crests at the same time. Therefore, for a given produced tool-joint thread, the distance between the changing pitch-cone diameters and crests remains constant throughout the entire full-depth thread. Since this distance is relatively small in comparison with the other dimensions of the thread, the distortions of threads created during subsequent production processes should have a negligible effect on this distance. Also, the dislocation of the pitch line with respect to the thread profile due to a change from distortions of the thread profile half-angles is negligible. Thus, for all practical purposes, the pitch cone can be considered to be equidistant from the crests, irrespective of the actual shape of the over-all thread.

The conclusion of the preceding paragraph is that the turning axis of the drum is also the axis for those thread points on the pitch cone which lie next to the contact points located on the crests, if the tool joints are aligned in the rotating drum as outlined before. Thus, the turning axis of the drum represents a fixed reference axis for thread measurements established by points on the actual pitch cone at the large- and small-diameter ends of the threads. In the following discussions, this reference axis will simply be called the "thread axis" when referred to the tool joints.

Plug and ring gauges can be aligned and inspected in the same manner as tool joints. Since plug and ring gauges are basically the physical representation of the tool-joint ends, the recordings of gauges, in principle, can be obtained in the same manner as for pin and box ends. Because of the accuracies involved and the small inherent errors in some elements of the machine, caution should be used in making conclusions from the recordings of reference or plant master gauges and new working gauges if the latter are produced to the same tolerances as the former. In principle, a higher precision machine could be constructed for conclusive inspection of master gauges. However, worn working gauges have, ordinarily, relatively large irregularities and therefore, rather positive conclusions concerning these irregularities can be made from the recordings obtained with the machine. Thus, periodic inspections of the working gauges with the machine would make it possible to detect gauge wear and to determine when a worn working gauge should be reworked.

To hold and align the gauges in the rotating drum with the same means used for the tool-joints, the gauges are mounted in adapters, such as shown in FIGS. 11 and 12, the adapters in both cases being analogous to the bodies of pin and box ends of tool-joints, to permit mounting of the gauges in the rotating drum of the machine.

The centering and aligning of the gauges within the drum are done with the aid of the aligning rings as described before. Here, however, a slight misalignment of the pitch cone with respect to the turning axis of the drum can occur even with perfectly aligned and centered aligning rings. On gauges, the thread flanks and the crests are usually ground in two operations and, therefore, the crests may be slightly eccentric with the pitch cone. This discrepancy, if any, is usually small and it can easily be recognized on the recordings as will appear hereinafter in a discussion of the effects of misalignment on chart recordings.

A recording of the deviations in thread pitch cone radius only can be obtained from the standard plug gauge, because the drive shaft cannot be installed. A recording of the lead deviations could be obtained if the lead screw were driven through the gauge itself. The latter would require some attaching means at the small-diameter end of the gauge. Providing such means on an existing gauge could cause distortions of the gauge. On a new or a reworked gauge, the required means could be provided. However, the lead deviations could be measured in the ordinary manner if a bore through the middle of the gauge were provided and a tubular handle used. Otherwise, the machine could be modified to dispense with the central screw drive shaft 11, as explained hereinabove; in which case all dimensional characteristics of a plug gauge could be recorded.

Referring to FIG. 11, the adapter 236 for a plug gauge includes a cylindrical body portion 237 which may be mounted in the rotating drum of the machine in the manner of a tool-joint body. The top surface of the cylinder is closed except for a bore 238 in an axial extension 237a of the cylinder, which bore loosely receives the handle 239 of the plug gauge 240. Set screws 238a in the extension 237a hold the handle within the bore in a secured position after the assembly has been tightened (see below). An accurately machined flat disk 241 bears against the fitting face 242 of the gauge and is also bored centrally thereof to receive the plug handle 239 therethrough. The underside of the disk 241 is mounted on the caps of machine screws 243 threaded into the top of the adapter cylinder 237. A pin 244 passes through diametrically aligned holes in the walls of the cylinder 237 and in the plug handle 239 and holds the plug gauge and adapter in assembled relation. Adjustment of machine screws 243 permits levelling of the disk 241 against the fitting face 242 of the gauge, and tigthening of the entire assembly. The assembled plug gauge and adapter is mounted and aligned in the drum so that the upper surface of the disk 241 is at the mounting level for pin shoulders and box faces, i.e., at the level of the top of the drum. Thus mounted, a recording of the deviations of thread pitch-cone radius from nominal may be taken by the stylus 130. A recording of the disk surface (from the stylus 199) would give an indication of the squareness of the fitting plate surface 242 with the gauge thread axis.

The recordings of deviations in both pitch-cone radius and the lead of a ring gauge can be obtained in the same manner as on box-end threads. Referring to FIG. 12, the ring gauge 245 is mounted in an adapter cylinder 246. The gauge rests on the top surface 248 of the cylinder and is secured in place by set screws 247. The assembly of the ring gauge and cylinder is such that the level of the fitting surface 249 of the gauge is square to the axis of the mounting drum.

Because of the standoff distance (nominally 0.625 inch for a 4½-inch tool joint) between the plug and ring gauges, the ring gauge 245 is mounted in the rotating drum so that the level of the fitting surface 249 is approximately ⅝ inch below the level of pin shoulders and box faces. This locates the ring-gauge thread in approximately the same vertical position as the box threads. If the vertical position of the ring gauges were different, e.g., fitting-plate surface at the same level as box faces, the position of the stylus 182 would be too far from nominal and the core of the LVDT 154 would move outside of the linear range of the LVDT. To avoid the latter condition, some adjustments of the linkage would be required. It is desirable, however, to obtain the ring-gauge recordings at the same setting of the internal attachment as is used for recording the box ends for reasons which will appear when the subject of measuring pitch-cone radius is described. The fitting-plate surface 249 of the ring gauge, if mounted ⅝ inch below the level of the box faces, cannot be reached with the stylus 199. The squareness of this surface can be checked with a dial indicator. If desired, a special, longer stylus or means for lowering the existing arrangement of the stylus 199 could be made for obtaining recordings of the fitting-plate surfaces on ring gauges.

Figures 13, 14:
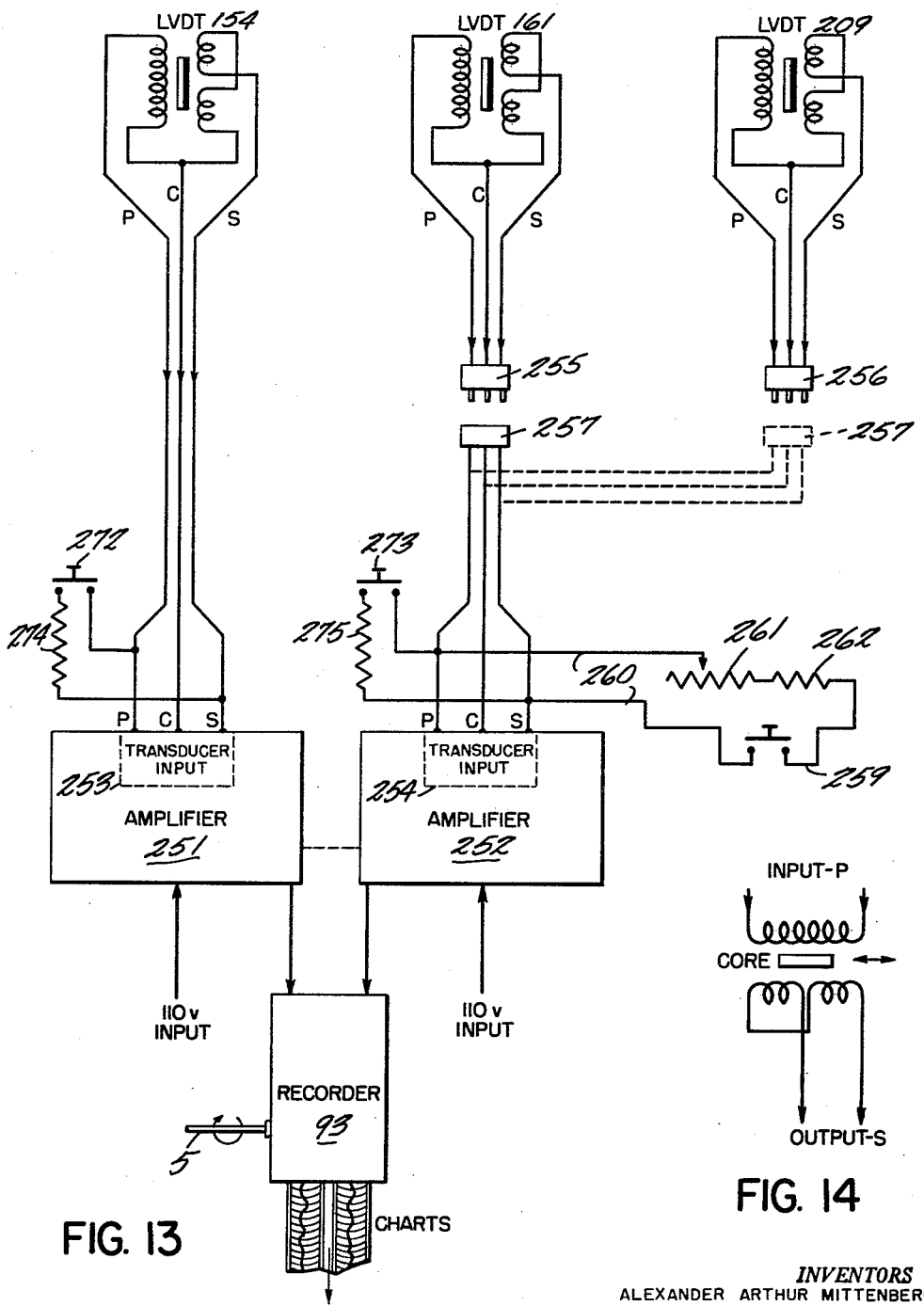
FIG. 13 is a schematic diagram of the electrical system of the present invention, including the recording instruments.
FIG. 14 is a schematic representation of the wiring of a linear variable differential transformer used with the sensing devices or probes.

The electrical system employed in the present invention for obtaining recordings is shown schematically in FIG. 13, and FIG. 14 represents the wiring of an LVDT. The LVDT 154, which is representative of all the LVDT's, is shown in FIG. 5 connected to the stylus 130.

The same size LVDT is selected for all styluses. In the present invention, the LVDT has a linear range of ±0.040 inch and is provided with a magnetic shield 250 (FIG. 5). Even for an LVDT with a magnetic shield, it is advisable not to have magnetic materials in the immediate vicinity of the LVDT in order to avoid influence of such materials on the electrical output of the LVDT. Consequently, all parts around the LVDT's are made of non-magnetic materials.

Referring to FIG. 14, normally, an LVDT wired for operation has four leads: two for input P (primary coil) and two for output S (secondary). The system employed in the present invention makes it possible to combine one input lead with one output lead in a common lead C (FIG. 13) and, thus, only three leads P, C, and S are required. Shielded two lead cables may be used, the shield serving as the common lead.

The electrical system consists, basically, of the three LVDT's 154, 161 and 209, two amplifiers 251 and 252 with installed transducer input boxes 253 and 254, a two-channel recorder 93, and the wiring.

All these are standard, commercially available parts. The principles, descriptions and operational instructions can be found in the literature and in manufacturers' catalogues and manuals.

It will be noted that the amplifier 252 is used alternately for LVDT 161 and LVDT 209, which LVDT's are respectively associated with the lead measuring stylus 131 and the shoulder and face measuring stylus 199. If desired, a third amplifier and a third recording channel could be used for obtaining face and shoulder recordings of tool-joints simultaneously with the recordings of the characteristics of the thread elements such as the pitch-cone radius and the lead. However, since the shoulder and face sensing stylus 199 is mounted independently of the carrier 6 (mounting styluses 130 and 131), the shoulder and face recordings can be taken subsequently to the taking of the recordings of the threads. The alignment of a pin- or box-end of a tool joint is undisturbed for all recordings, hence the recorded charts can be properly referenced by means of revolution signals (to be described) irrespective of the order of taking the thread and face or shoulder recordings. As seen in FIG. 13, electric plugs 255 and 256 in the three-wire leads from the LVDT's 161 and 209 are adapted to couple separately said leads to the amplifier 252 through a socket 257 in the wiring to the amplifier.

Reverting to FIGS. 1 and 2, a knuckle 258 attached to the rotating drum 3 actuates a microswitch 259 (mounted on the spindle housing top plate 46) once every revolution of the tool joint. Returning to FIG. 13, the microswitch 259 closes for a brief interval an electric circuit 260 connected to the amplifier 252. Closing the circuit causes a change in electrical output and results in movement of the recorder pen, which leaves a revolution signal on the recorder chart (see FIGS. 16 and 17). Again referring to FIG. 13, the electric circuit 260 contains resistances 261 and 262 and it is connected to the primary P and secondary S leads of the amplifier 252. One resistance 262 is constant, to avoid shorting out the circuit, and the other resistance 261 is adjustable from zero to its full value. The latter provides means to adjust the revolution signals on the chart to any desirable size at the various amplifications of the electrical system. In line with the knuckle 258 (FIG. 2), a mark 263 is placed at the top of the rotating drum 3. Placing the tool joints within the drum in a known angular position with respect to the mark and, thus, to the revolution signals establishes the angular relation between the tool joints and the recordings.

When operating the machine for testing and making recordings of tool-joint threads and shoulder and face surfaces, it is first necessary to balance and calibrate the electrical system. For balancing purposes, the electrical zero of each LVDT must be established. In other words, that position of the core with respect to the coils must be found at which there is no electrical output. When taking recordings, this position, however, should be avoided to eliminate the effects of the small electrical hysteresis on the recordings which occurs when the LVDT goes through the zero position. Thus, the operating range should be on one side of zero only. The starting position of the LVDT when taking a recording should be selected according to the anticipated deviations of the threads and their direction. It was found by experiment that, for inspecting 4½-inch tool joints, it is sufficient in most cases to offset the starting point by approximately 0.005 inch from the electrical zero of the LVDT.

The mechanical means for finding the electrical zero of LVDT 154 and adjusting the starting position are shown in FIG. 5 and they can be partially seen also in FIG. 1. The position of the core 153 is determined by the stylus 130 (or the stylus 182 for the boxes) when the latter is put in engagement with a thread. The coil of the LVDT 154 is pressed into a sleeve 264 which can slide in the bore 265 of the carrier bracket 144 but is restricted from turning by a key 266 which rides in a groove 267 in the bracket. The sleeve with the coil is positioned between a spring-loaded thrust member 268 and the stylus guide 150. The latter can be turned in a thread (20 threads per inch) by a notched flange 269 having ten notches 270 on the circumference. Thus, turning the flange by one notch moves the coil 0.005 inch. Such an arrangement allows moving the coil to find the electrical zero and then offsetting the coil by any desired amount from zero for the starting position.

Calibration of the LVDT 154 may be done with a mechanical micrometer (not shown). After the electrical system is balanced and the starting position selected, the carrier 6 is swung out and a micrometer is placed in line with the stylus 130 against the ball 143. The micrometer may be fastened to the brace 27 of the drum 3. First the stylus is depressed to the starting position by the micrometer. This action is controlled by the recording equipment. Then, the micrometer is turned a known distance and the electrical output represented by the recorder-pen movement is found on the recorder chart. The electrical output can be adjusted with the amplifier to give a selected distance on the chart for a given distance of micrometer travel. Thus, the scale of the recording can be established. This scale can be varied over a wide range by manipulating the electrical system.

In the case of the internal attachment for measuring box ends, calibration of the LVDT 154 is done with a micrometer which may be placed against the ball of stylus 182 (FIG. 6).

For finding the electrical zero, selecting the starting position, and calibrating the LVDT 161, lead stylus 131 is moved by the nut 10. This is done with stylus 130 placed in starting position in contact with the tool-joint threads before installing the drive shaft 11. The nut 10 is lowered or raised with a crank 271 which fits inside the lead screw 9 (see FIG. 1). Bringing the LVDT 161 to the starting position and calibration are controlled by a dial indicator (not shown) which may be attached for this purpose to the frame 2 and put in contact with the nut 10 from above. After calibration is done and the starting position has been set, the crank 271 and the dial indicator are removed. The drive shaft 11 is then installed and locked in place without changing the positions of the lead-screw nut 10 and the rotating drum 3.

With respect to the LVDT 209 (associated with the shoulder and face tracing stylus 199), the balancing of the electrical system, the selection of the starting position and calibration, in principle, are done in the same manner as described before. Here, however, a simplified procedure can be employed. A small-size precision shim having a known thickness is placed on a shoulder or face surface under the stylus ball. Then, the electrical zero of the LVDT 209 is found by turning the setscrew 207 (FIG. 2). Removal of the shim offsets the starting point of the LVDT by a distance equivalent to the thickness of the shim, and the corresponding pen movement on the chart establishes the scale of the recording.

For continuous inspection of tool-joint threads, it is sufficient to balance and to calibrate the LVDT 154 and the LVDT 161 only once at the beginning of the operation. To provide means for checking whether the calibration has changed during the operation, push-button switches 272, 273 (FIG. 13) are wired to each amplifier. These boxes contain a known electrical resistance 274, 275. The circuit of each resistance is connected to the primary P and secondary S leads. Actuating the switches closes the circuit and causes the recorder pen to move. The distance of movement remains constant so long as the calibration has not changed. Thus, finding the distance of pen movement on the chart from the push-button arrangement after the initial calibration establishes a reference for periodic checks on calibration during operation.

The LVDT's must be rebalanced and recalibrated after each interruption in power supply to the amplifiers and also when a change from the LVDT 161 to another LVDT 209 or back is made. The latter does not require that the LVDT 154 be rebalanced.

Figure 17:
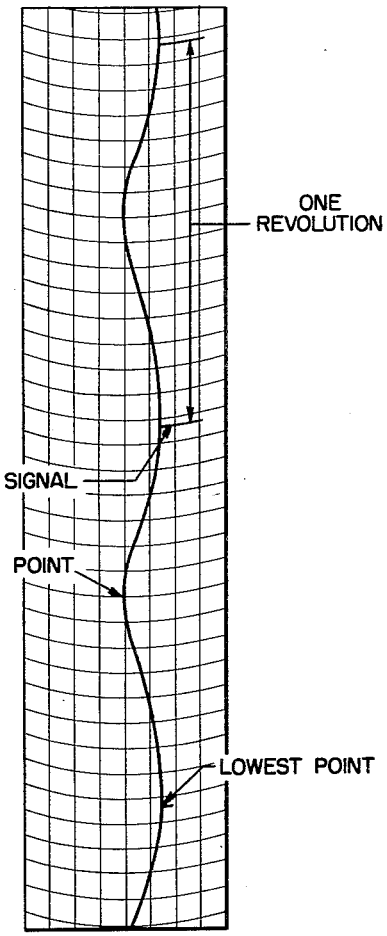
FIG. 17 is a chart recording of a pin-end shoulder surface.

After the machine drum 3 is loaded with a tool joint or gauge which is carefully aligned with the axis of the drum as previously explained, the LVDT's 154 and 161 are balanced and calibrated. The lead screw drive shaft 11 is then inserted through the lead screw and locked to the drum spindle 42 by the Morse taper at the lower end of the shaft. With the carriage 6 in operative position with its styluses engaging threads and the square surface of the leadscrew nut, by rotating the spindle, drum, lead screw and recorder in synchronism by means of the hand wheel 4 in front of the spindle housing 45, recordings of pitch-cone radius and thread lead variations of the tool joint from nominal are obtained. The carriage 6 is then swung out of position, shoulder or face unit 12 is swung into operative position, its LVDT 209 is plugged into the amplifier 252 (after unplugging the LVDT 161 of the lead measuring stylus) then balanced and calibrated and the machine again operated to obtain shoulder or face recordings. Typical charts containing thread and shoulder or face recordings are illustrated in FIGS. 16 and 17.

To unload a tool-joint from the machine, the carrier 6 and unit 12 are swung into retracted inoperative position. The drive shaft 11 is removed from above by tapping it out of its Morse taper seat by means of bolt 117 as previously explained, and the tool-joint is removed from the drum. The machine is now ready to receive another tool-joint for inspection.

Figure 16:
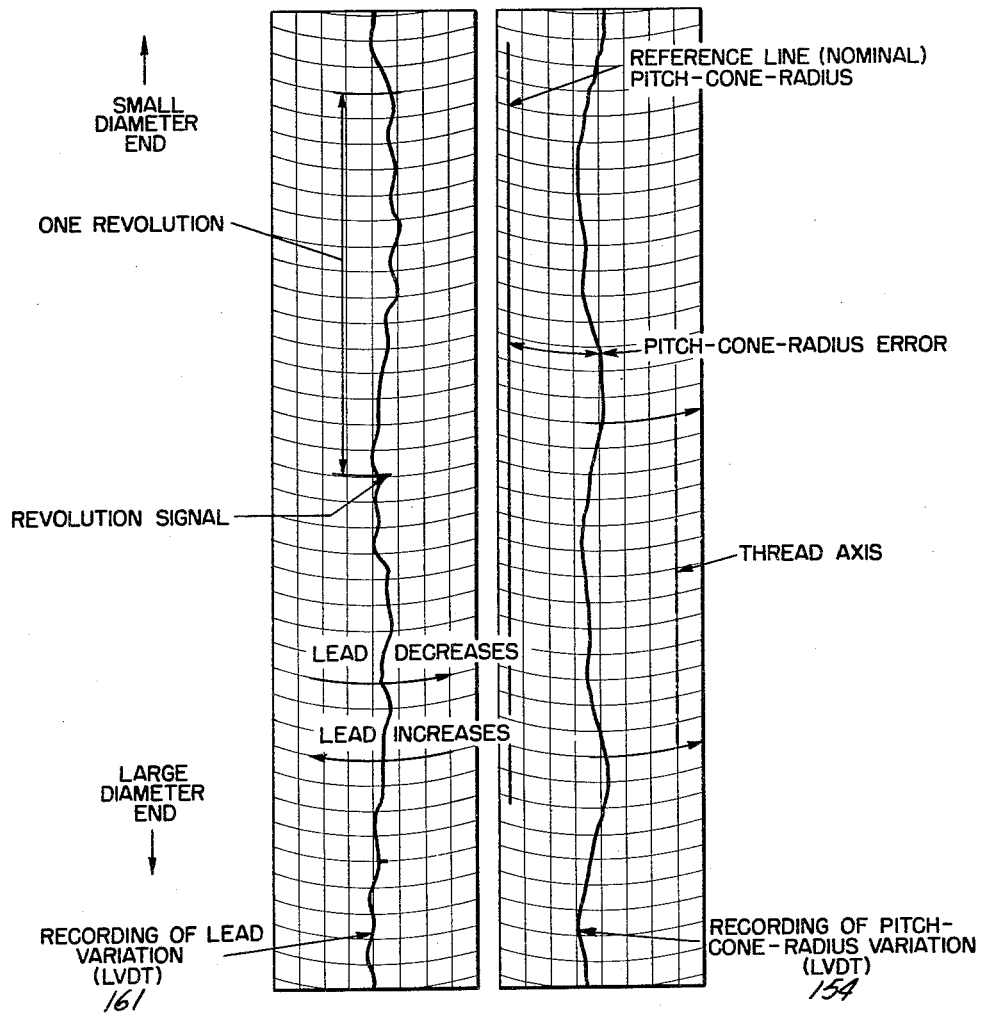
FIG. 16 is a partial chart recording of a pin-end thread.

FIG. 16 shows a portion of an actual recording obtained from a pin-end thread. The recorded line on the right-hand side of the chart represents the variations of the pitch-cone radius, and the other one the variations in lead. For a perfect thread at a perfect alignment within the rotating drum (the effects of misalignments are described later), the two recorded lines should be straight and parallel to the direction of the chart. Any departure of the recorded lines from the chart direction thus indicates the deviations from nominal in the two thread elements, pitch-cone radius and lead. From these recordings, if analyzed along the entire thread, the geometry of the pitch cone can be determined. This includes the taper angle, taper straightness, the roundness of the pitch cone, the thread-lead variations, and the local irregularities of the threads. The magnitudes of the variations can be obtained directly from the charts. All dimensions of the thread can be determined, with the exception of the actual values of the pitch radii. The latter, however, can be determined if measurements of a pitch radius are taken at one thread location and a reference line on the chart is established (see later).

The directions of the variations as obtained on the recordings depend on the direction of rotation of the rotating drum and on the electrical system. These directions can be easily established experimentally if the direction of a stylus movement is compared with the direction of its recorder pen. In FIG. 16, the direction of pitch-cone-radius variations is indicated by the given location of thread axis, and for the lead the directions are spelled out. The location of a recording with respect to the chart width is unimportant as long as the recording remains within the chart.

FIG. 17 shows an actual recording of a pin-end shoulder surface. These recordings are obtained at the same setting (alignment) of the tool-joint as the recording of the thread. Thus, the relationship between the thread geometry and the shoulder surface can be easily established and the shoulder recording can be analyzed both by itself and with respect to the thread.

If the stylus 199 were located in the same radial plane and on the same side of the thread axis as the styluses 130 and 131, the proper circular relationship between the shoulder recording and the recordings of the thread could be established by placing both charts next to each other and aligning the revolution signals. A different location of the stylus 199 (e.g., as dictated by design considerations) requires that the revolution signals on both charts be offset with respect to each other. The direction and the distance by which the revolution signals must be offset depend on the rotational direction of the drum and the angular location of the stylus 199 in relationship to the stylus 130. For the recordings shown in FIGS. 16 and 17, obtained with the present equipment, the revolution signals of the shoulder chart should be below the signals of the thread chart by a quarter of a turn (a quarter of the distance between the revolution sigals), as the stylus 199 is located 90 degrees rotationally in advance of the styluses 130 and 131, although in FIG. 3 stylus 199 is shown displaced from this position for the purpose of clarity.

The stylus 199 contacts the shoulder surface on a circle centered at the thread axis. Therefore, the recording indicates, essentially the flatness of this circle and its squareness with respect to the thread axis. These two factors are important. An out-of-flatness of the shoulder would influence the sealing ability of the rotary connection. An out-of-squareness would affect the tool-joint fit and create additional bending stresses in the tool joints and the other drill-string elements.

A recording of a perfectly flat and square shoulder would appear on the chart as a straight line parallel to the chart direction. A perfectly flat shoulder which is out of square with respect to the thread axis would appear on the chart as a sine wave of period length equal to the distance between revolution signals. Thus, a sine wave indicates out-of-squareness, and distortion of a pure sine wave indicates an out-of-flatness in addition to the out-of-squareness.

The recording from the stylus 199 would not indicate surface irregularities such as a taper or curve if this surface were a surface of revolution about the thread axis. However, considering the manufacturing processes used in producing the shoulder surfaces, the likelihood of such irregularities is small. Also, a tapered or curved rotational surface would have little effect on the tool-joint fit or on the sealing ability of the connection.

In principle, the recordings of the box-end threads look the same as those for pins, and they can be analyzed in the same manner as those for the pin-end threads. The only difference in a box-end recording is that the small-diameter end now appears on the bottom of the chart and the large-diameter end on the top (see FIG. 16).

There is no difference in interpretation of pin-shoulder and box-face recordings when these are considered individually. When the face recording is analyzed in relation to the box threads, however, the offset in the revolution signals is different because one stylus 182 traces the thread on the opposite side of the other stylus 130. For the system used, the revolution signals of face recording must be aligned a quarter turn above those of the thread chart to put both the charts in proper circular position with respect to each other.

Since the plug and ring gauges are basically the physical representation of the theoretical dimensions of the tool-joint threads, the recordings of gauges, in principle, can be obtained and analyzed in the same manner as described for pin and box ends.

The diameter of a taper thread changes with its axial location. Ordinarily, the pitch diameter is specified at a certain axial location. For 4½-inch full-hole tool-joints, the nominal pitch diameter is 4.632 inches located 0.625 inch from the shoulder and face surfaces. Often this diameter is referred to as the pitch diameter at gauge point. For a perfect taper thread, the pitch diameter is twice the pitch radius. On an actual thread, however, two pitch-cone radii at the same axial location can be different from each other because of thread irregularities.

Obviously, the geometry of the entire thread can be described more precisely by the pitch-cone radii than by the pitch-cone diameters. The pitch-cone radius is defined as the distance between the thread axis and the pitch line as determined by the groove width of the thread profile, at a given axial location. Pitch-cone diameter is the distance between the two opposite pitch lines measured perpendicular to the thread axis at a given location. For simplicity, the term "pitch radius" will be used in this discussion to mean the radius of the pitch cone at any axial location.

The recordings obtained from the styluses 130 and 182 of external pin-end and of internal box-end threads indicate the deviations but not the absolute values of the pitch radii. To determine the latter, it is sufficient to know the actual value of only one pitch radius at a certain location. This would enable a reference line on the recording to be established, and from this reference line, the other radii can be determined along the entire recording of the thread. Therefore, it is desirable to obtain a pitch-radius measurement in a manner permitting this measurement to be related directly to the recordings. An independent measurement would not be suitable.

The actual pitch radius at a certain axial location from shoulder or box face could be calculated from the positions of the carrier and the stylus with respect to the carrier at this location, a direct measurement of the distance between the balls of one stylus 130 or the other stylus 182 and the turning axis at a known carrier position and at a known stylus position with respect to the carrier, and the dimensional constants of the equipment. If the distance of the ball from the turning axis is measured against the tip of the ball and the distance from the latter to the pitch line of the thread is calculated from the nominal geometric relations between the ball and the thread profile, some errors may be introduced from the ball if it is not perfect or if it is worn. To avoid these possible discrepancies, a V-shaped groove with the same half-angles as the thread profile could be placed against the ball when the distance of the ball from the turning axis is measured. The removable drive shaft is not rigid enough to be used as the basis for accurate measurements. Therefore, two highly precise measuring fixtures (one for external and one for internal threads) having V-grooves at known distances from their center lines would be required, and these fixtures would have to be centered and aligned in the rotating drum very accurately.

A simpler and more practical method for determining the actual pitch radii of tool-joints, however, can be employed. Instead of finding the actual value of a pitch radius at a certain axial location, the error of this radius is determined against a gauge thread. In this method, the pin end is compared with a plug gauge and the box end with a ring gauge.

The following procedure is used:

(a) The process of taking thread recordings is interrupted when the carrier reaches a position within a predetermined range. It is advantageous, from the analysis standpoint, to stop the carrier at a revolution signal of the recordings;

(b) Three distances, A, B, and C (see FIG. 15 for a pin end), are measured at this carrier position. [The measurement A is the vertical distance between two accurate surfaces, one of which is fixed and stationary on the equipment and the other is on the carrier; B is the vertical distance between an accurate surface on the carrier and the tool-joint shoulder or face; and C is the horizontal displacement of the stylus 130 with respect to the carrier.] And (c) The measuring point is marked on the chart and the process of taking the thread recordings is resumed.

Figure 15:
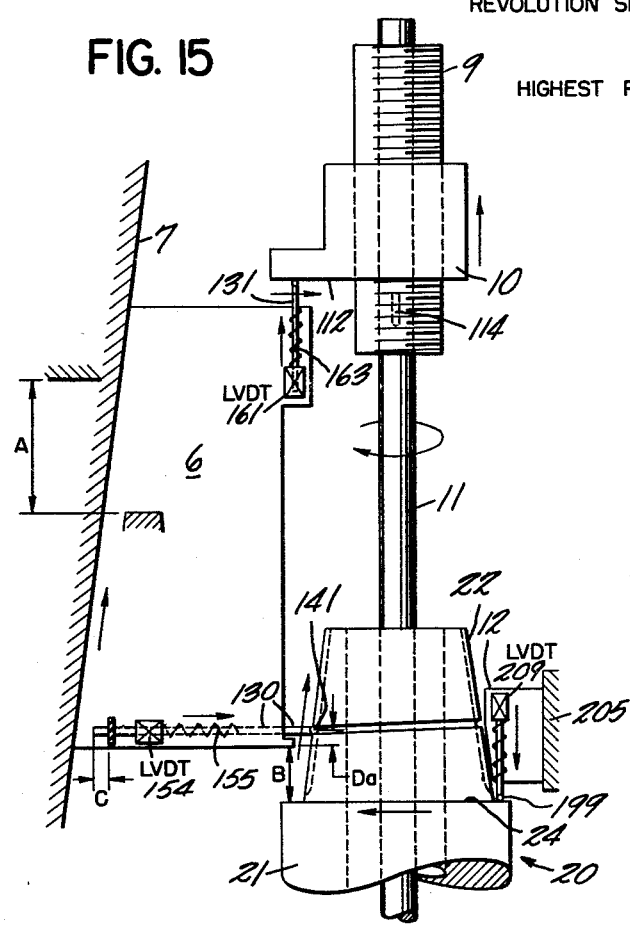
FIG. 15 is a diagram illustrating the scheme for obtaining recordings and measurements of pin ends.

The scheme for determining the pitch-cone radius for pin ends is illustrated in FIG. 15, wherein the dimensions A, B and C are clearly shown.

The same measurements are taken for box ends, although, of course, the measurement B is taken on the face of the box end which is installed at the same level as the shoulder of the pin end. These measurements are also indicated in other figures of the drawing: A in FIG. 1, B in FIG. 6, and C in FIG. 5.

Measurements A and B can be taken with standard measuring devices, such as dial bars, internal micrometers, parallels with external micrometers, or precision calipers. Precautions should be taken, however, not to apply pressures with these measuring devices on the measuring surfaces, in order to avoid errors in the measurements.

Measurement C has much higher significance than A and B. It is obtained with an electrically controlled micrometer screw. The scheme of this system is shown in FIG. 5. The micrometer 276 is mounted in an insulator 277, disposed in a bracket 282 mounted on a carrier 6 by screws 283, and an electrtical circuit 278 is provided between the micrometer 276 and the carrier 6. At the first contact between the micrometer and the extension 279 of the stylus 130 an electric lamp 280 is lit. The electrical system is operated by dry batteries 281, and may be placed inside a bracket (not shown) on the machine frame. Since a micrometer pressure against the extension 279 would influence the measurement (when inspecting box-ends, it may even pull the stylus 182 out of the thread groove) the micrometer must be turned very gently and stopped as soon as the light comes on. Experience shows that the reproducibility of this system is the same as the accuracy of the reading obtained—within 0.0001 inch. Formulas for pitch-radius-error computations (to be derived) contain a difference only of two C readings: one for the tool joint and the other for a gauge. Therefore, the absolute values of C are unimportant as long as both measurements are taken from the same reference point. The latter requirement is fulfilled by the fixed position of the micrometer. Thus, the readings obtained from the micrometer can be placed directly into formulas for pitch-radius error, regardless of their absolute values. This implies that the position of the micrometer is not critical and the readings obtained may not necessarily be the actual distances C as shown.

The same three distances are measured also for a gauge at approximately the same carrier position. On plug gauges, a corresponding distance $B_g$ is measured against the adapter disk 241 mentioned before (see FIG. 11). On ring gauges, a distance $B'_g$ is measured against the fitting plate 249, which is located within the rotating drum approximately 5/8 inch below the level of shoulders and faces, this being the stand-off distance between ring and plug gauges. From the two sets of measurements, one for a gauge and the other for a tool joint, the pitch-radius error of a tool-joint thread at its measuring point can be easily computed.

For pin-end threads, the pitch-radius error is:

$$E_p = (C - C_g) + \frac{m}{2n}[(A+B) - (A_g + B_g)]$$

where:

A, B and C are the measurements for a pin-end thread;

$A_g$, $B_g$ and $C_g$ are the measurements for a plug-gauge thread; and $m:n$ is the nominal thread taper (3 inches per foot for 4½-inch diameter pin ends; $m:n = 1:4$)

For box-end threads, the pitch-radius error is:

$$E_b = \frac{l_b}{l_a}(C - C'_g) - \frac{m}{2n}[(A+B) - (A'_g + B'_g - S)]$$

where:

A, B and C are the measurements for a box-end thread;

$A'_g$, $B'_g$, and $C'_g$ are the measurements for the ring-gauge thread;

$m:n$ is the nominal thread taper;

$l_a$ and $l_b$ are the upper and lower lengths of the lever arm of the internal attachment (see FIG. 6); and S is the nominal standoff distance for the gauges (0.625 inch for 4½-inch API tool-joint gauges).

When using the foregoing equations, the algebraic signs must be observed. A positive result of the pitch-radius error means that the actual tool-joint pitch radius is larger than that of the gauge. Ordinarily, this will be the case for box-end threads. On pin ends the actual pitch radius usually will be smaller than that of the plug gauge, and this will be indicated by the negative sign of the computed pitch-radius error.

Measurements C have more significance than measurements A and B. This is to be expected because of the geometric relation in a taper between the change in diameter and the axial distance. When obtaining the gauge measurements, it is advisable to obtain also the recording of the gauge thread. If there were any misalignment of the gauge pitch cone with respect to the turning axis, this would be indicated on the recordings by approximate sine waves. Then, from gauge-thread recordings, measurement $C_g$ can be corrected to cancel the effect of gauge misalignment. The amount by which measurement $C_g$ should be corrected is determined by the distance on the gauge pitch-cone recording (perpendicular to the chart direction) between the measuring point and the straight average line (base or center line) of the sine waves. Usually, this distance is relatively small, and therefore it can often be disregarded.

Measurements B, if desired, can be adjusted from the shoulder and face recordings to relate them to an assumed common reference level, e.g., to the highest points or average levels of these surfaces. Unless the shoulder and face surfaces are considerably out of square with the thread axis, such an adjustment of measurements B has relatively small influence on the computed pitch-radius error. The amount of the adjustment can be determined directly from the shoulder or face recording if these are placed in proper circular relation to the thread recordings, as described before. For pin ends, the measured shoulder location will appear on the shoulder recording on the same horizontal line as the measuring point on the thread recording. For box ends, because of tracing the thread on the opposite side, the measured face location on the face recording will be offset by a half revolution with respect to the measuring point for the threads.

Obviously, only one set of plug-gauge measurements is required to determine the pitch-radius errors of a large number of pin ends. A new set of plug-gauge measurements would be required if the stylus ball became worn (see later) or if a change, such as replacing a part affecting the critical distances, were made in the equipment. The same applies to the ring-gauge measurements as long as the setting of the internal attachment is not altered. If the internal attachment is removed or readjusted, a new set of ring-gauge measurements must be taken for use in computing box-end pitch-radius errors from recordings and measurements obtained at the same setting of the internal attachment.

The computed pitch-radius error makes it possible to draw a reference line on the recording (see FIG. 16). This line is established from the measuring point by the distance corresponding to the error. From this reference line, the errors of pitch radii can be measured along the entire thread recording. The actual pitch radii can be determined, if desired, by adding the errors (with their algebraic signs) to the nominal pitch radii at the various axial locations. The axial distance of the measuring points from pin shoulders or box faces can be determined from the B measurements and the dimensional constants $D_a$ and $D_b$ (see FIGS. 6 and 15). The constants $D_a$ and $D_b$ represent the distances between the centers of the stylus balls and the accurate surface on the carrier from which the distance B is measured. Thus, the axial distance of the measuring points from the pin shoulders becomes $D_a + B$ and that from the box faces $D_b - B$. From these distances, the nominal pitch radius at the measuring points can be determined.

The method described assumes that the gauge thread is perfect, which, of course, is not true. However, possible errors in the reference or plant master gauges and in new working gauges are relatively small in comparison with those of tool-joints. In gauges, the pitch diameter at gauge point is controlled rather accurately. The API specified tolerance on pitch diameter is ±0.0004 inch for the 4½-inch plug gauge. This means that the possible variation in pitch radius at gauge point is ±0.0002 inch, which is of the same order as the probable effect of the accumulated errors in the three measurements, A, B, and C.

If the pitch radius of the gauge is measured at an axial location other than the gauge point, additional errors are possible from the variations of gauge tapers. The specified taper tolerance for plug gauges is 0/+0.0004 inch per gauge length of 3⅜ inches. On pitch radius in 1-inch axial distance, this would give a discrepancy of approximately 0/−0.00006 inch. For ring gauges, with the specified taper tolerance of −0.0004/−0.0012 inch on the same gauge length, the discrepancy of pitch radius in 1-inch axial distance would be +0.00006/+0.00018 inch.

From the above, it is apparent that the measurements for gauges should be taken, if possible, in the vicinity of the gauge point to decrease the effects of gauge-taper variations. This is possible on a plug gauge but not a ring gauge. On ring gauges, the first full thread is approximately ⅝ inch from the gauge point. This condition, however, could decrease somewhat the discrepancy of +0.00006/+0.00018, because the pitch diameter of a ring gauge is established by mating it with a plug gauge to the required standoff distance. Since the taper tolerances of gauges have opposite directions (plus for plug gauge and minus for ring gauge), the actual pitch diameter of the ring gauge at gauge point would be smaller than that of the plug gauge if all the other gauge thread elements were perfect.

Generally speaking, the discrepancies from the gauge variations are relatively small if the measuring point is chosen within 1 inch from the gauge point and the plant master or new working gauges are employed. Measurements of used working gauges should not be used as the basis for tool-joint pitch-radius-error computations.

The method described for determining the pitch-radius errors for tool-joint threads has, as just shown, some inherent errors. These errors, however, are relatively small in comparison with the discrepancies of the actual tool-joint threads. The chosen method is justified also because the geometric irregularities of actual tool-joint threads cannot be checked by the gauges, whereas, in the absence of any irregularity, the pitch diameter at gauge point would be controlled by the gauges rather accurately. Therefore, the irregularities, rather than the precise value of the pitch diameter, are of primary importance in the analysis of the tool-joint thread geometry. An indication of the actual size of the pitch diameter, however, is required because of its influence on the fit between two tool-joints.

A more accurate method for determining pitch radii of the tool-joint threads or measuring the pitch radii of gauges could be used if measuring fixtures, such as described before, were constructed and employed.

In the preceding description of the method for obtaining dimensional data on tool-joint threads, it was assumed that the tool-joint alignment within the rotating drum is perfect. A perfect alignment of the pitch cone, theoretically, could be achieved with the described set of aligning rings only on taper threads produced with profiled, topping cutting tools if everything were perfect. On threads produced by other methods, as already mentioned for the API gauges, a perfect alignment is impossible, even theoretically.

In actual use of the described method, a certain misalignment of the tool-joint thread axis with respect to the turning axis of the drum will always be present. It will be caused by small inaccuracies of the aligning rings, the small inaccuracies of the equipment and the aligning process. The misalignment caused by the last depends on the accuracy and sensitivity of the dial indicators employed, the rigidity of the indicator holders and supports, and the skill of the operator.

For a perfect thread at a perfect alignment, both the pitch-cone-radius and lead recordings, as already mentioned, would appear as straight lines parallel to the chart direction.

Three conditions of misalignment may occur. There may be pure eccentricity, with the thread axis being parallel to the drum turning axis and rotating around the latter (such eccentricity would have no effect on the lead recording). The pitch-cone radius would be recorded as misalignment waves resembling very closely sine waves of period length equal to the distance between revolution signals. A misalignment will occur where the thread axis intersects the turning axis. For this condition both recordings would be sine waves of period length equal to the distance between revolution signals. Finally, in a general case of misalignment, the thread axis is inclined with respect to the turning axis and these axes do not intersect. Geometrically, such a case of misalignment is a combination of pure eccentricity and a misalignment with intersecting axes. The recorded misalignment wave would be the geometric sum of two sine waves.

Recordings of actual threads represent thread irregularities and misalignment waves and should be analyzed with respect both to the misalignment waves and to the chart direction. Using the misalignment waves as a reference, the thread recording can be analyzed and the deviations (departures from the sine-like misalignment waves) determined in the same manner as for recordings with a negligible degree of misalignment.

It is possible to align the tool joints so that no runout of the aligning rings is indicated by dial indicators of 0.0001-inch precision. Actually, a certain amount of tool-joint misalignment will exist even at such close alignment of the rings because of small imperfections in the rings themselves and some springback of the indicator supports. If the latter are rigid enough, the expected tool-joint thread misalignment could be on the order of 0.0001 to 0.0002 inch. The effect of such misalignment is small in comparison with the variations of tool-joint threads and, therefore, this misalignment can be disregarded when the recordings are analyzed.

Ordinarily, it would be very time consuming and, therefore, impractical to obtain an alignment such as described in the preceding paragraph. Of course, with better alignment, the recordings are less distorted by the misalignment waves and easier to analyze. On the other hand, a relatively good indication of thread irregularities can be also obtained from recordings which are taken of tool-joints at a total misalignment of, perhaps, 0.003 to 0.005 inch. Therefore, the desired degree of accuracy in aligning of the tool-joints should be chosen according to the purpose of the recordings. For example, a simple check to determine whether a tool-joint thread has some large irregularities would require only a rough alignment within a few thousandths-of-an-inch. For dimensional studies of tool-joint threads or gauges, the alignment should be as accurate as possible.

A study and analysis of the effects of thread-profile errors has indicated that variations in the thread profile can be kept within limits if both the profiled cutting tools and the process of producing tool-joint threads are sufficiently controlled. Under ordinary conditions, there should be neither excessive discrepancies in the thread truncations nor an interference between thread roots and crests when two tool-joints are screwed together. Since the thread truncations have no effect on the thread recordings or measurements obtained with the method described, these discrepancies can be disregarded in an over-all analysis of tool-joint thread dimensions.

It has also been found that profile flank angle variations have relatively small effect on the possible over-all discrepancies of the tool-joint threads. The fit of two tool joints when they are made up, or the fit of a tool-joint with its gauge, could be influenced considerably more by other thread errors, at least as long as the profile flank half-angle errors are within the specified tolerance of ±½ degree. Thus, from the standpoint of thread geometry, the variations in profile half-angles have less significance than the possible variations in other thread elements.

The profile half-angle variations, however, influence the position of the stylus ball within the thread groove and, therefore, may cause errors in the recordings and measurements as obtained with the described method. However, a dimensional study of flank-angle variations has disclosed that the range of magnitude of recording errors created by the half-angle errors is small enough to be disregarded, at least as long as the half-angles stay within the specified limits, which is easily attained under known production controls.

The balls of the styluses which probe the threads slide along the entire thread and, therefore, some wear of the balls will occur. A ball having equally worn flat spots in contact with both flanks of a thread would ride on the peaks of the flank surfaces and the styluses would not register all of the localized thread irregularities. The over-all irregularities, however, would be registered and the recordings would look similar to those obtained from a new ball except that the former would be somewhat smoothed out. In many cases this condition can be tolerated, provided the wear of the ball is not excessive. It has been determined that for a 4½-inch tool-joint thread errors can be neglected if the ball is not permitted to have a worn spot any larger than about 0.005 inch in diameter.

The wear on the balls on the styluses contacting the lead screw nut and the shoulder and face surfaces of tool joints is considerably smaller because of shorter sliding motion and lighter spring pressures and, practically, it has no influence on the recordings, unless, of course, the wear becomes excessive.

The machine of the present invention is capable of detecting and recording local thread variations and irregularities on the order of 0.00001 inch and less if sufficiently high electrical amplification is used. On actual tool joints, however, the over-all thread variations are relatively high and such amplification would cause the recorder pen to move outside of the chart range. Furthermore, the overall accuracy of the machine is limited by the accuracy of its components. The critical components have already been discussed. Some inherent errors of the method have been described. These include the errors in determining the pitch radius against gauges, the effects of flank-angle variations on the recordings, and the effects of a worn stylus ball. The misalignment of the tool joints within the rotating drum is also a contributing factor toward the over-all inaccuracies of the method. The recordings obtained, as already mentioned, generally include a certain amount of misalignment. When these recordings are analyzed, the effects of misalignment must be separated from the actual variations of the threads.

On the basis of experience with the equipment, the component errors, and the inherent errors of the method, the following estimated accuracies for the tool joints can be obtained with the machine described if the tool-joint alignment within the rotating drum is held within 0.0001 inch:

```
                                                           Inch
On local thread variations and irregularities_____  0.00005
On lead (over the entire recording)_____  0.0004
On taper (over the entire recording)_____  0.0004
On pitch-radius error_____  0.0008
On squareness and flatness of the shoulder and face
  surfaces_____  0.0002
```

The accuracies obtained in lead, taper, pitch-radius error, and the squareness and flatness of shoulder and face surfaces are about 10 percent of the permissible tolerances in these thread elements. The accuracy for the variations of the threads, however, indicating how much a thread departs from a uniform geometric shape (roundness and straightness of the pitch cone, local irregularities in pitch radius and lead, etc.), is considerably higher and it could be increased further if higher electrical amplification were used.

The specified embodiment of the invention described and exemplified is intended to be illustrative only, as modifications thereof in the construction, assembly and arrangement of the components of the apparatus and in the principles of the methods employed will be apparent to those skilled in the art, within the scope of the appended claims.

What is claimed is:

1. A method of obtaining continuously a description of the thread lead variations and irregularities of a threaded member, which comprises in combination the steps of firstly establishing a thread axis independently of the other elements of the member, secondly aligning the thread axis in a direction parallel to the axis of a lead screw having the nominal lead of the thread to be described, thirdly rotating the threaded member and the lead screw in synchronism, fourthly tracking the threads of the member and the lead screw in a rectilinear direction parallel to the axes of rotation by means of elements movable relative to one another in said direction, and finally taking continuous indications of the relative displacements of the movable elements.

2. A method of of obtaining continuously a description of the pitch radius variations and irregularities of a threaded member, which comprises in combination the steps of firstly establishing a thread axis independently of the other elements of the member, secondly rotating the threaded member about the thread axis, thirdly tracking the thread in a rectilinear direction in a fixed plane of the axis of rotation by means of an element movable relative to the thread axis in a direction normal to the axis, and finally taking continuous indications of the displacements of the movable element normal to the thread axis.

3. A method of measuring the deviations from nominal of the thread elements of a threaded part continuously along the thread length, which comprises in combination the steps of establishing a reference axis for the thread independently of the other elements of the part being measured, aligning the axis of the thread in a direction parallel to the axis of an accurate reference screw having the nominal lead of the thread being measured, rotating the threaded part and the lead screw synchronously, tracing the thread groove with a probe and by means thereof driving a first member mounted for rectilinear travel as the tracing probe follows the thread groove of the part being traced in a fixed axial plane thereof, tracking the lead screw with a second member fixed against angular rotation, following an axially square surface of one of said members with a sensing device mounted on the other of said members and resiliently biasing the sensing device into contact with the square surface of said one member, and continuously indicating the linear displacements of the sensing device relative to said other members.

4. A method of measuring simultaneously the deviations from nominal of the pitch cone radius and the lead of a taper-threaded member continuously along the entire length of the thread, which comprises in combination the steps of establishing a thread reference axis independently of the geometry of the other elements of the member, aligning the thread reference axis parallel to the axis of a lead screw having the nominal lead of the thread being measured, locking the thread and the lead screw in fixed angular relation with their axes in fixed relation to a slide mounting a carriage and being in oblique position for nominal taper relative to the axis of the thread, rotating the thread and the lead screw synchronously, continuously tracing the thread groove with a resiliently biased stylus mounted on the carriage and normal to and in a fixed axial plane of the thread axis, driving the carriage on the slide by means of the stylus, tracking the lead screw during rotation thereof by means of a member fixed against rotation and having a flat surface square to the lead screw axis, sensing the flat surface with a resiliently biased stylus mounted on said carriage and normal to the surface, and obtaining simultaneous continuous indications of the relative displacements of the styluses with respect to the carriage.

5. A method of measuring the variations from nominal in the pitch-cone radius and lead of a rotary taper-thread member continuously along the length of the thread, which comprises in combination the steps of mounting the member on a rotatable support which is axially aligned with an accurate lead screw having the nominal lead of the thread to be measured, establishing a reference axis for the taper thread which is independent of the other elements of the member and aligning the reference axis with the axis of the lead screw, locking the member and lead screw against relative angular movement, rotating the member and lead screw relative to a carriage mounted on a slide fixed to the nominal taper of the thread to be measured, mounting in said carriage a thread sensing stylus axially slidable in said carriage normal to the thread axis in an axial plane thereof and having resilient biasing means urging the stylus into engagement with the thread flanks, providing the lead screw with a nut fixed against rotation and having a horizontal surface square to the axis of the lead screw, mounting in said carriage a lead nut sensing stylus axially slidable in the carriage normal to the nut surface and in the same plane as the thread sensing stylus and having resilient biasing means urging the lead nut sensing stylus into engagement with the nut surface, operating a multi-channel recorder synchronously with the member and the lead screw and obtaining recordings of the linear displacements of the styluses by coupling them to the cores of linear variable differential transformers operating in the circuits controlling the recordings.

6. A method of determining the squareness and surface irregularities of a shoulder or face of a rotary threaded member, which comprises in combination the steps of firstly establishing a reference axis for the threads of the member independently of the geometry of the other elements of the member and secondly rotating the member about the axis and taking continuous readings of the shoulder or face irregularities in a fixed plane in a direction parallel to the axis of rotation while maintaining the member against axial displacement.

7. A method according to claim 6, which includes the steps of taking the readings by following the shoulder or face irregularities with a sensing device resiliently biased against the shoulder or face in a direction parallel to the axis of rotation and continuously indicating displacements of the sensing device.

8. A method according to claim 5, which includes the steps of measuring the irregularities in and the squareness of a shoulder or face surface when measuring externally and internally threaded members respectively, by mounting a surface sensing stylus on a base fixed relative to the axis of rotation and resiliently biasing the surface sensing stylus against the shoulder or face surface in engagement therewith in a direction parallel to the axis of rotation, coupling the surface sensing stylus coaxially to the core of a linear variable differential transformer controlling an electrical circuit operating a recorder, and obtaining a recording of the surface sensing stylus displacements relative to the shoulder or face surface.

9. A method according to claim 5, which includes mounting threaded members with the shoulder or face surfaces respectively in a common position transverse to the axis of rotation, and aligning the respective recordings to facilitate a dimensional analysis thereof.

10. A method of establishing a thread reference axis for a member having a taper thread, which comprises assembling two rings in coaxially sliding relation, the rings having cylindrical lands made to the nominal taper of the thread, mounting said rings so that both lands contact the thread crests along the taper of the thread at longitudinally spaced locations thereon, aligning the common axis of said rings with the axis of a rotatable member support, securing the member to the support in the position of alignment of the rings with the support to establish the thread reference axis and removing the rings.

11. A machine for measuring the errors or deviations in lead and pitch radius of a threaded member, comprising in combination a frame, a rotatable support on said frame to support a threaded member for rotation about the axis of the threads of the member in fixed angular and axial relationship to the support, a lead screw having the nominal lead of the threaded member and supported by said frame in axially parallel relationship to the rotatable support, means to rotate synchronously the lead screw and the rotatable support, a reciprocable carriage, an adjustable carriage slide adapted to be positioned in a plane parallel to the axes of the rotatable support, thread and lead screw and to be positioned to the nominal taper of the thread being measured, a first sensing device movably mounted on said carriage and adapted to trace continuously the flanks of the threaded member as the member is rotated and to drive the carriage along its slide, said first sensing device being restricted to unidirectional movement relative to said carriage in a direction normal to the axis of the thread, a follower on the lead screw retained against rotation and adapted to traverse the lead screw upon rotation of the latter, a second sensing device movably mounted on the carriage, adapted to contact the follower of the lead screw and being restricted to unidirectional movement relative to the carriage in a direction parallel to the axis of the thread, said sensing devices movably contacting the thread and follower on points in a fixed axial plane of the thread, resilient means on each of said first and second sensing devices to bias them into contact respectively with the thread and the follower and means for indicating the displacements of said sensing devices relative to the carriage continuously during rotation of the thread being measured.

12. A machine according to claim 11, in which the rotatable support includes a spindle, a drum mounted on said spindle, and means on the drum to releasably support the threaded member.

13. An apparatus for measuring deviations from nominal and the irregularities of the pitch-cone radius and lead of a taper-threaded member simultaneously and continuously along the length of the thread, comprising a frame, a rotatable thread member support on said frame, an accurate lead screw on said frame having the nominal lead of the thread of the member to be measured and being in axial parallelism with the rotatable support, said member being mounted for rotation about the axis of the thread portion of the member in alignment with the axis of the rotatable support, means for rotating the rotatable support, the thread and the lead screw synchronously, a tracking member on the lead screw, a portion of said tracking member providing a flat surface square to the axis of the lead screw, a carriage slide mounted on the frame in a plane parallel to the axis of rotation of the thread and made to the nominal taper of the thread being measured, a carriage reciprocable on said slide, two sensing devices mounted on the carriage, the first sensing device being mounted for restricted movement relative to the carriage in a path normal to the axis of rotation and being resiliently biased into probing engagement with the thread flanks of the threaded member in a fixed axial plane of the latter, the second sensing device being mounted on the carriage in the same plane as the first sensing device for restricted movement relative to the carriage in a path parallel to the axis of rotation of the thread being measured and being resiliently and slidingly biased against the flat surface of the tracking member on the lead screw.

14. An apparatus according to claim 13 including means for indicating the displacements of the sensing devices relative to the carriage.

15. An apparatus according to claim 14, in which the sensing devices are styluses connected to the cores of linear variable differential transformers, including a recorder which is driven in synchronism with the thread being measured and electrically coupled to the transformers.

16. An apparatus for measuring the characteristics of a threaded member, comprising an accurate lead screw having the nominal lead of the threaded member, means for mounting said member and said lead screw with the axis of the threads parallel to that of the lead screw, means to fix said threaded member and lead screw against axial displacement, means to rotate said threaded member and said lead screw synchronously, a reciprocable carrier, a track mounting said carrier, a first sensing device to trace the threaded member as it is rotated, said first sensing device being mounted on the carrier and adapted to drive it along the track which is mounted parallel to the thread taper of the member being measured, means for tracking the lead screw, a second sensing device mounted on said carrier for indicating relative displacements between the carrier and the means for tracking the lead screw in a direction parallel to the axis of rotation of the lead screw and threaded member, and means for continuously indicating the displacements of the sensing devices in relation to the carrier.

17. A thread testing apparatus comprising a frame, means carried by said frame to rotatably mount a threaded body to undergo test for rotation about the thread axis without axial displacement, a reference screw having the accurate lead of the thread to be tested and being rotatably mounted on said frame and fixed against axial displacement, said reference screw and said threaded body being mounted axially parallel to one another, means for rotating the threaded body and reference screw synchronously, means for tracking the body thread in a fixed axial plane of the thread axis upon rotation of the threaded body, means for tracking the reference screw in a fixed axial plane thereof upon rotation of the screw, and means for continuously indicating the relative axial displacements of the body thread and reference screw tracking means upon synchronous rotation of said body and screw.

18. An apparatus according to claim 17 in which the reference screw tracking means includes a non-rotatable member threadedly engaged with said screw, and the body thread tracking means includes a thread probe, a reciprocable member carrying said probe, and a rectilinear track for said probe carrying member mounted on the frame and so positioned that the probe is reciprocable in the said axial plane of the threaded body, said probe being mounted on the carrying member for unidirectional movement relative to the carrying member normal to the thread axis of the threaded body and being resiliently biased into engagement with the threads.

19. An apparatus according to claim 18 in which the means for indicating relative axial displacements of the body thread and reference screw tracking means includes a sensing device mounted on one member for unidirectional movement relative to said one member parallel to the axes of the screw and body thread, said sensing device being resiliently biased into contact with the other member on a surface thereof square to the axes of the screw and body thread, and means for continuously indicating movements of the sensing device relative to said one member.

20. An apparatus according to claim 18 in which the track is so positioned that the probe is reciprocable in a direction parallel to the theoretical thread pitch line in the said axial plane of the body thread, including means for continuously indicating the movements of the probe relative to the probe carrying member.

21. A thread testing apparatus comprising a frame, an accurate reference screw rotatably mounted on said frame, being fixed against axial displacement and having the nominal lead of a threaded body to be tested, means on said frame for rotatably mounting a threaded body to undergo test, the body being fixed against axial displacement and rotatable with its thread axis parallel to the axis of the reference screw, a carriage, a rectilinear track supported on said frame and mounting said carriage for reciprocation therealong, said track being positioned parallel to the thread being tested, a pair of sensing devices mounted on said carriage, one sensing device being adapted to trace the threaded body longitudinally thereof as the latter is rotated to thereby move the carriage along the track, means for tracking the reference screw, the other sensing device indicating relative displacements between the carriage and the means for tracking the reference screw in a direction parallel to the axis of the screw, means for rotating the screw and threaded body synchronously, and means for continuously indicating the displacements of the sensing devices in relation to the carriage.

References Cited in the file of this patent

UNITED STATES PATENTS

| | | |
|---|---|---|
| 1,904,130 | Garms et al. | Apr. 18, 1933 |
| 2,366,394 | Gerber | Jan. 2, 1945 |
| 2,448,106 | Mannerbrink et al. | Aug. 31, 1948 |
| 2,630,633 | Webb | Mar. 10, 1953 |
| 2,648,135 | Gates | Aug. 11, 1953 |
| 2,752,687 | Graham | July 3, 1956 |
| 2,763,068 | Starbuck | Sept. 18, 1956 |
| 2,817,154 | Swanson | Dec. 24, 1957 |